(12) United States Patent
Nakamura

(10) Patent No.: US 7,570,823 B2
(45) Date of Patent: Aug. 4, 2009

(54) MOVING PICTURE CODING APPARATUS, MOVING PICTURE CODING METHOD, AND MOVING PICTURE IMAGING APPARATUS

(75) Inventor: Kenji Nakamura, Sakai (JP)

(73) Assignee: Panasonic Corporation, Osaka (JP)

( * ) Notice: Subject to any disclaimer, the term of this patent is extended or adjusted under 35 U.S.C. 154(b) by 769 days.

(21) Appl. No.: 11/222,222

(22) Filed: Sep. 9, 2005

(65) Prior Publication Data

US 2006/0062479 A1  Mar. 23, 2006

(30) Foreign Application Priority Data

Sep. 10, 2004  (JP)  ............................. 2004-264418
Sep. 2, 2005  (JP)  ............................. 2005-255228

(51) Int. Cl.
*G06K 9/36* (2006.01)

(52) U.S. Cl. .................................................. 382/236

(58) Field of Classification Search ......... 382/232–233, 382/236, 238–240, 244–251; 358/394.1–395.1, 358/407.1–416.1; 375/240.03, 240.12–240.13, 375/240.16, 240.23

See application file for complete search history.

(56) References Cited

U.S. PATENT DOCUMENTS

| 5,963,673 | A  | * | 10/1999 | Kodama et al. ............. 382/239 |
| 6,011,868 | A  | * | 1/2000  | van den Branden et al. . 382/233 |
| 6,037,987 | A  | * | 3/2000  | Sethuraman ........... 375/240.03 |
| 6,243,497 | B1 | * | 6/2001  | Chiang et al. ............... 382/251 |
| 6,259,739 | B1 | * | 7/2001  | Kondo ................... 375/240.23 |
| 6,650,787 | B1 | * | 11/2003 | Takahashi et al. ........... 382/251 |
| 6,661,840 | B1 |   | 12/2003 | Hiranaka |
| 7,031,542 | B2 | * | 4/2006  | Takahashi et al. ........... 382/251 |

\* cited by examiner

*Primary Examiner*—Jose L Couso
(74) *Attorney, Agent, or Firm*—McDermott Will & Emery LLP

(57) ABSTRACT

When a frame (n+1) is to be inter-coded after inter-coding a frame n (S142: INTER), a moving picture coding apparatus determines a quantizer scale Q[n+1] to be used in quantization of the frame (n+1), using a first method, based on an amount of generated codes Cn of the frame n (S143). When the frame (n+1) is to be inter-coded after intra-coding the frame n (S142: INTRA), the moving picture coding apparatus determines the quantizer scale Q[n+1] to be used in quantization of the frame (n+1), using a second method, based on the amount of generated codes Cn of the frame n (S143). The quantizer scale determined by using the second method takes a smaller value than that determined by using the first method.

10 Claims, 28 Drawing Sheets

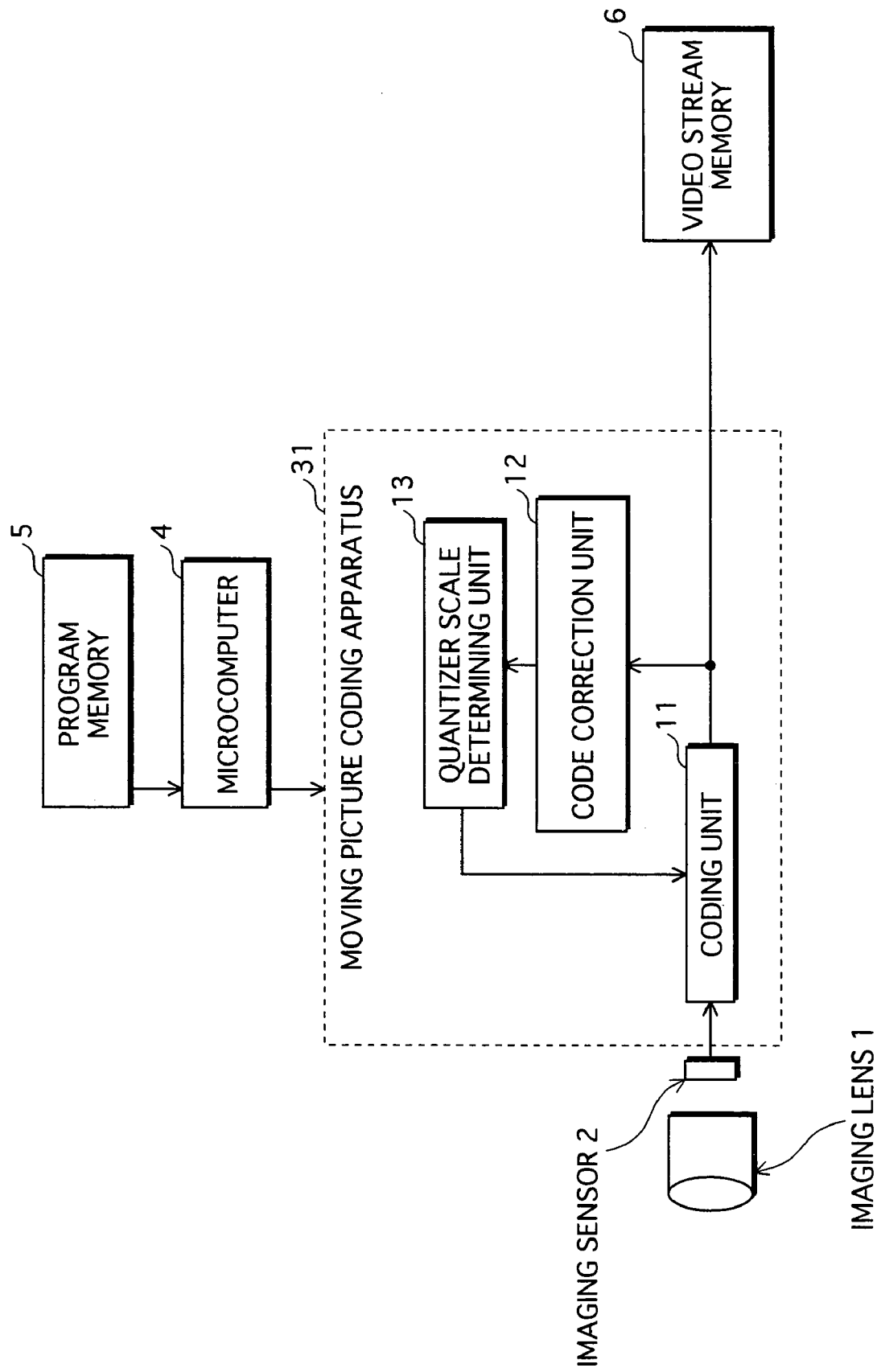

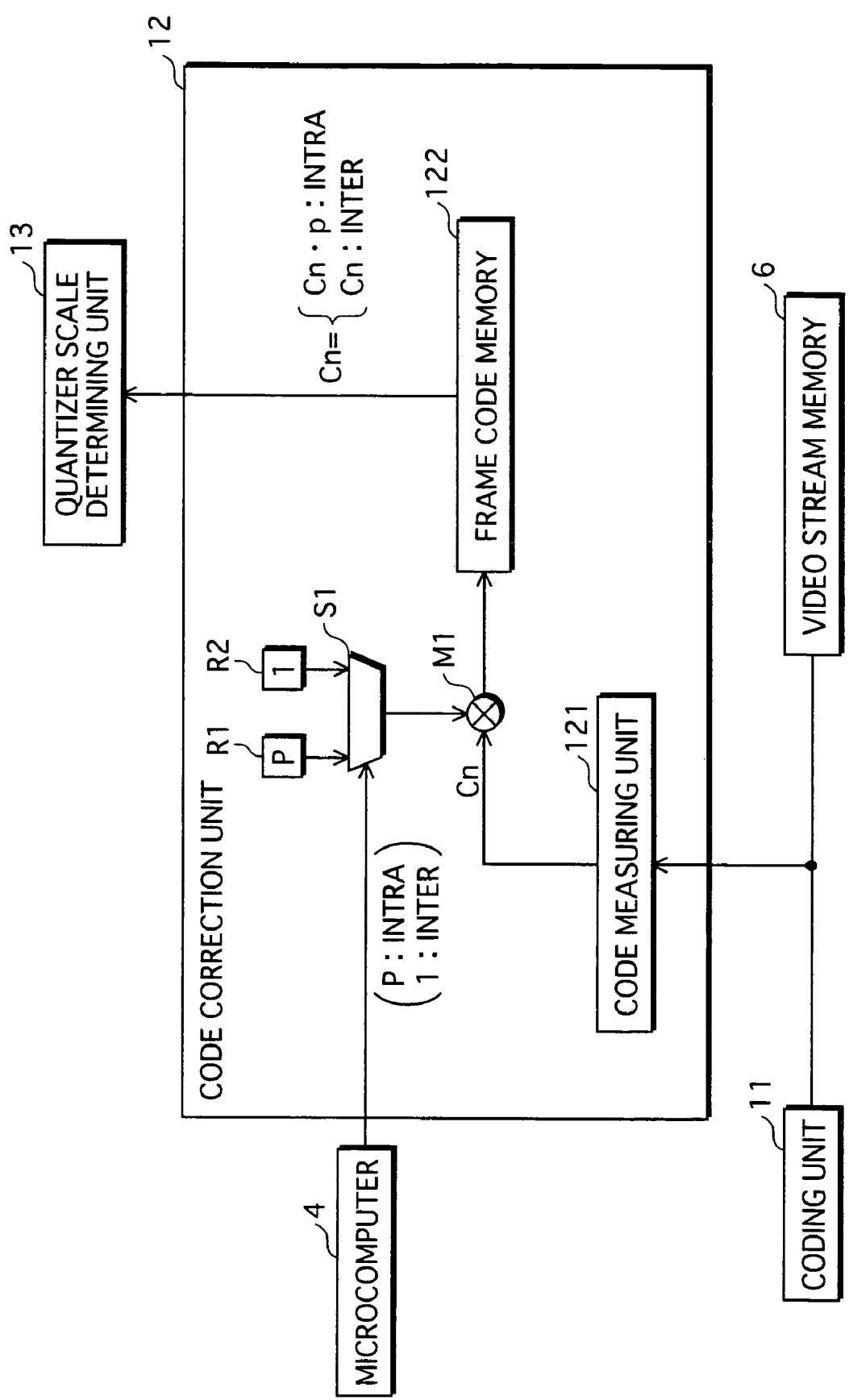

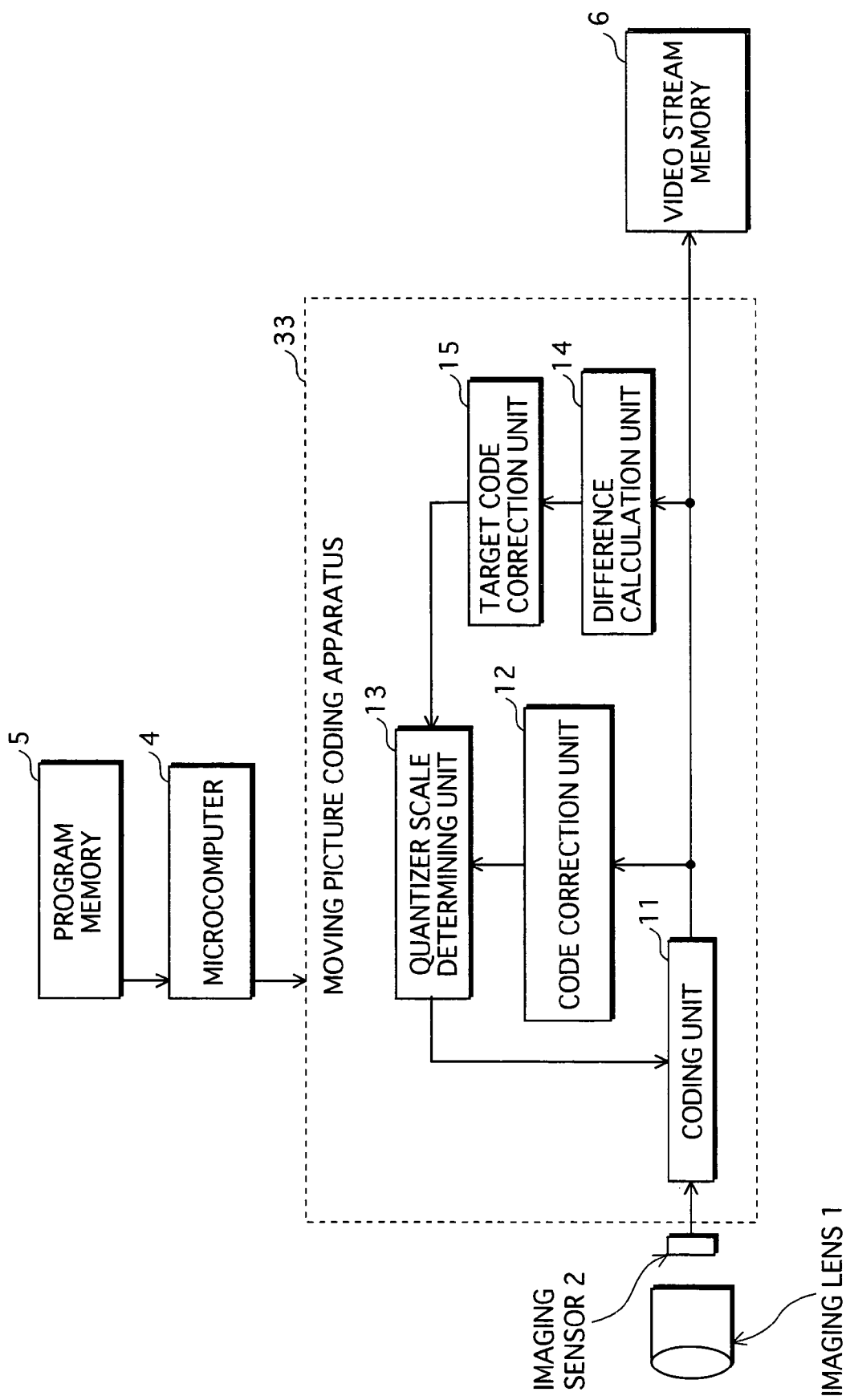

FIG.21

| INTER-CODE FRAME (n) | | INTRA-CODE FRAME (n) | | 
|---|---|---|---|
| QUANTIZER SCALE FOR FRAME (n) | QUANTIZER SCALE FOR FRAME (n+1) | QUANTIZER SCALE FOR FRAME (n) | QUANTIZER SCALE FOR FRAME (n+1) |
| 1 | 2 | 1 | 2 |
| 2 | 3 | 2 | 3 |
| 3 | 5 | 3 | 4 |
| 4 | 6 | 4 | 5 |
| 5 | 7 | 5 | 6 |
| : | : | : | : |
| 30 | 31 | 30 | 31 |
| 31 | 31 | 31 | 31 |

MOVING PICTURE CODING APPARATUS, MOVING PICTURE CODING METHOD, AND MOVING PICTURE IMAGING APPARATUS

BACKGROUND OF THE INVENTION (1) Field of the Invention

The present invention relates to moving picture coding apparatuses, moving picture coding methods, and moving picture imaging apparatuses for coding moving pictures. In particular, the present invention relates to a technique to determine quantizer scales used in quantizing data of the moving pictures.

(2) Description of the Related Art

Generally, a moving picture imaging apparatus is equipped with a moving picture coding apparatus for compressing data of moving pictures taken with the moving picture imaging apparatus. Such a moving picture coding apparatus compresses the data by quantization. Quantization is a method to compress data by replacing data values with discrete representative values. Intervals between the representative values are defined by a parameter called a quantizer scale. As the quantizer scale becomes greater, the compression rate becomes higher (i.e. a code size becomes smaller).

According to an example of conventional models of moving picture coding apparatuses, a fixed value is used as a quantizer scale for a frame to be intra-coded (so called I picture) to determine a different quantizer scale for each of frames to be inter-coded (so called P picture or B picture) (See ISO/IEC-14496-2 for example). In order to determine the quantizer scales for the frames to be inter-coded, a formula 1 below is used.

$$Qp[n+1]=(Cn/dstC)*Qp[n] \quad \text{Formula 1}$$

In this formula, $Qp[n]$ is a quantizer scale used in quantization of a frame n, Cn is an amount of codes generated in the frame n, and dstC is a target amount of codes to be generated that is predetermined for one frame.

According to the formula 1, a quantizer scale $Qp[n+1]$ for a frame (n+1) becomes larger as the amount of codes Cn generated in the frame n to the target amount of codes dstC becomes larger.

The formula 1 works in a manner so as to suppress an amount of codes to be generated in the frame (n+1). By determining the quantizer scale in the above manner for each frame, it is possible for the moving picture coding apparatus to adaptively bring the amount of codes generated in the inter-coded frame closer to the amount of codes generated to the target amount of codes.

Because an amount of codes generated in an intra-coded frame affects image quality to a large extent, a quantizer scale for a frame to be intra-coded is generally determined so that the amount of codes generated in these frames becomes larger than the target amount of codes. In this case, the above moving picture coding apparatus tries to suppress an amount of codes generated in a frame 2 that comes immediately after the intra-coded frame (frame 1). As a result, the amount of codes generated in the frame 2 becomes much smaller than the target amount of codes. Then, the moving picture coding apparatus tries to make an amount of codes generated in a frame 3 larger than the target amount of codes. As explained above, with conventional moving picture coding apparatuses, hunting in the amounts of codes generated in several frames immediately after the intra-coded frame occurs.

FIG. 1 show diagrams showing shifts of an amount of codes generated in each frame and image quality in a conventional moving picture coding apparatus.

In this example, frames 1, 11, and 21 are intra-coded frames, and the rest of the frames are inter-coded frames. In this figure, the hunting in the amount of generated codes as described above can be observed in four frames immediately after each intra-coded frame (FIG. 1A).

In general, the image quality improves more, as the amount of generated codes increases. Therefore, the hunting in the amount of generated codes makes the image quality unstable (FIG. 1B). As a result, the images become unsightly.

Such a problem is not limited to the models that determines quantizer scales for each frame, and can also be observed in models that determines quantizer scales for each block line (a line of macro blocks that are positioned in matrix in an image).

SUMMARY OF THE INVENTION

An object of the present invention is to provide a moving picture coding apparatus, a moving picture coding method, and a moving picture imaging apparatus that are capable of suppressing hunting in amounts of codes generated in several frames immediately after a frame that has been intra-coded.

A moving picture coding apparatus according to the present invention comprises a coding unit operable to selectively inter-code or intra-code data of each of a plurality of frames of a moving picture, the inter-coding and intra-coding each involving quantization; and a determining unit operable to determine, based on an amount of codes generated in a first frame, a quantizer scale to be used in quantization of data of a second frame, wherein when the coding unit is to inter-code the data of the second frame, the determination is done by using (i) a first method if data of the first frame has been inter-coded, or (ii) a second method if the data of the first frame has been intra-coded, the quantizer scale determined by using the second method taking a smaller value than that determined by using the first method.

According to the above structure, when the first frame is intra-coded, the quantizer scale for the second frame is determined using the second method. As a result, the quantizer scale for the second frame becomes smaller than the case in which the first method is used.

In the conventional technology, the quantizer scale for the second frame is determined always using the same method (i.e. the first method), regardless of the type of predictive coding performed in the first frame.

On the other hand, the quantizer scale for the second frame becomes smaller in the present invention than in the conventional technique, and therefore it is possible to diminish a drastic decrease in the amount of codes generated in the second frame. As a result, hunting in amounts of codes generated in several frames immediately after the intra-coded frame can be suppressed.

The above moving picture coding apparatus may also be such that the second method is set in a manner that the quantizer scale determined by using the second method falls within a range of ⅕ to ⅓ inclusive of that determined by using the first method.

Generally, if the same quantizer scale is used, an amount of codes generated in an intra-coded frame becomes three to five times greater than codes generated in an inter-coded frame. According to the above structure, the quantizer scale for the second frame is roughly about the same, no matter whether the first frame is intra-coded or inter-code. Specifically, even when the first frame is intra-coded, it is handled as if the first frame were inter-coded when determining the quantizer scale for the second frame. In general, the hunting does not occur very often in a section in which frames are inter-coded. Therefore, by employing the above structure, it is possible to suppress the hunting of the amounts of codes generated in the frames after the second frame.

The above moving picture coding apparatus may further comprise a difference obtaining unit operable to obtain a difference between (i) a cumulative amount of codes generated in the first frame and frames preceding the first frame and (ii) a cumulative target amount of codes predetermined for the first frame and the frames preceding the first frame, wherein the first and second methods are set in a manner that the determined quantizer scale becomes greater as an amount of the difference to the amount of generated codes becomes greater.

According to the above structure, as the difference between the cumulative amount of generated codes and the cumulative target amount of codes becomes greater, the quantizer scale for the second frame also becomes greater. Specifically, it works so as to suppress the amount of codes generated in the second frame. As a result, the cumulative amount of generated codes shifts so as to roughly match the cumulative target amount of codes. Thus, it is possible to bring the amount of generated codes closer to the target amount of codes for an entire moving picture.

The above moving picture coding apparatus may also be such that when the cumulative amount of generated codes is smaller than the cumulative target amount of codes, the first and second methods are set in a manner that the quantizer scale becomes greater as the amount of generated codes becomes greater, regardless of the amount of the difference.

In the moving picture, when a correlation between frames is high, an amount of codes generated in each frame to the target amount of codes decreases. According to the above structure, however, the amount of generated codes is not increased even in such a case, and it is possible to have a spare free space in the memory capacity. By this, the overflow of the memory capacity can be avoided even when the correlation between frames suddenly drops.

The above moving picture coding apparatus may further comprise a buffer operable to store the coded data for the moving picture, wherein when the buffer has a free space of a predetermined size or larger, the first and second methods are set in a manner that the quantizer scale becomes greater as the amount of generated codes becomes greater, regardless of the amount of the difference.

According to the above structure, when the free space is the predetermined size or larger, it works so as to suppress the amount of codes generated in the second frame. Therefore, it is possible to avoid the overflow of the buffer.

The above moving picture coding apparatus may also be such that when the coding unit is to intra-code the data of the second frame, the determining unit sets a fixed value as the quantizer scale.

According to the above structure, it is not necessary to determine the quantizer scale every time when a frame is to be intra-coded. Thus, it is possible to downsize a circuit of the moving picture coding apparatus.

The above moving picture coding apparatus may also be such that when the coding unit is to intra-code the data of the second frame after coding the data of the first frame, the determining unit determines the quantizer scale by using a third method, the quantizer scale determined by using the third method taking a greater value than that determined by using the first method.

According to the above structure, the quantizer scale for the second frame is determined using the third method. By employing this method, the quantizer scale for the second frame becomes larger in comparison with the case in which the first method is used. As a result, the amount of codes generated in the second frame becomes smaller than when using the first method, and it is possible to prevent the amount of codes generated in the second frame from becoming too large.

The above moving picture coding apparatus may further comprise a buffer operable to store the coded data for the moving picture, wherein when the coding unit is to intra-code the data of the second frame after coding the data of the first frame, the determining unit (i) sets the quantizer scale to a fixed value if the buffer has a free space of a predetermined size or larger, and (ii) determines the quantizer scale by using a third method if the buffer has a free space smaller than the predetermined size, the quantizer scale determined by using the third method taking a greater value than that determined by using the first method.

According to the above structure, it is possible to adjust the amount of codes generated in the intra-coded frame according to the size of the free space of the buffer. Thus, it is possible to avoid the overflow of the buffer.

The above moving picture coding apparatus may also be such that when the coding unit is to intra-code the data of the second frame after coding the data of the first frame, the determining unit determines the quantizer scale to be used in the second frame based on a quantizer scale used in quantization of the first frame, regardless of the amount of generated codes.

According to the above structure, the quantizer scale is determined regardless of the amount of codes generated in the first frame. Therefore, in comparison with the case in which the quantizer scale is determined according to the amount of generated codes, it is possible to reduce the processing load of the moving picture coding apparatus.

The above moving picture coding apparatus may also be such that when the coding unit is to intra-code the data of the second frame after coding the data of the first frame, the determining unit determines the quantizer scale to be used in the second frame by multiplying the quantizer scale used in the first frame by a predetermined value.

According to the above structure, the quantizer scale for the second frame is determined based on the quantizer scale for the first frame.

The above moving picture coding apparatus may also be such that the predetermined value is in a range of $5/4$ to $4/3$.

According to the above structure, as the predetermined value becomes larger, the effect of suppressing the amount of codes generated in the intra-coded frames improves, but the image quality becomes lower. A result of a simulation makes it clear that it is possible to obtain both the effect of suppressing the amount of codes generated in the intra-coded frames and an excellent image quality by setting the predetermined value in the range of $5/4$ to $4/3$, inclusive.

The above moving picture coding apparatus may further comprise a recording unit operable to record a table showing correspondence between the quantizer scale for the first frame and the quantizer scale for the second frame, wherein the determining unit determines the quantizer scale to be used in the second frame based on a quantizer scale used in the first frame by referring to the table.

According to the above structure, it is possible to determine the quantizer scale for the second frame based on the quantizer scale for the first frame.

The above moving picture coding apparatus may also be such that the determining unit determines the quantizer scale to be used in the second frame based on respective quantizer scales used in a predetermined number of preceding frames in addition to the quantizer scale used the first frame.

By determining the quantizer scale based on more than one frame, it is possible to improve the effect of suppressing the hunting, although the processing load in the moving picture coding apparatus increases.

Further, a moving picture coding apparatus according to the present invention comprises: a coding unit operable to selectively inter-code or intra-code data of each of a plurality of block lines of a moving picture, the inter-coding and intra-coding each involving quantization; a correction unit operable to correct (i) an amount of codes generated in one or more inter-coded block lines, using a first method, out of a predetermined number of coded block lines, and (ii) an amount of codes generated in one or more intra-coded block lines, using a second method, out of the predetermined number of coded block lines, the amount of codes generated in one or more inter-coded block lines that has been corrected by using the second method taking a smaller value than that corrected by using the first method; and a determining unit operable to determine a quantizer scale to be used in quantization of data of a next block line, when the coding unit is to inter-code the data of the next block line, based on a total of the amounts of codes generated in the intra-coded block lines and inter-coded block lines that have been corrected.

According to the above structure, the quantizer scale to be used in the next block line to be coded can be smaller, in comparison with the case in which the amount of generated codes is corrected regardless of the coding method. Therefore, the amount of generated codes in the block line when coded does not decrease easily. As a result, the hunting in the amount of codes generated in several block lines immediately after the intra-coded block can be suppressed.

The above moving picture coding apparatus may also be such that the second method is set in a manner that the amount of codes generated in one or more inter-coded block lines by using the second method falls within a range of ⅕ to ⅓ of that corrected by using the first method.

Generally, if the same quantizer scale is used, an amount of codes generated in an intra-coded block line becomes three to five times greater than codes generated in an inter-coded block line. According to the above structure, even when the first block line is intra-coded, it is handled as if the first block line were inter-coded when determining the quantizer scale for the second block line. In general, the hunting does not occur very often in a section in which block lines are inter-coded. Therefore, by employing the above structure, it is possible to suppress the hunting of the amounts of codes generated in the block lines after the second block line.

A moving picture imaging apparatus according to the present invention comprises an imaging device operable to take an image of an object to generate a moving picture; a coding unit operable to selectively inter-code or intra-code data of each of a plurality of frames of the moving picture, the inter-coding and intra-coding each involving quantization; and a determining unit operable to determine, based on an amount of codes generated in a first frame, a quantizer scale to be used in quantization of data of a second frame, wherein when the coding unit is to inter-code the data of the second frame, the determination is done by using (i) a first method if data of the first frame has been inter-coded, or (ii) a second method if the data of the first frame has been intra-coded, the quantizer scale determined by using the second method taking a smaller value than that determined by using the first method.

Further, a moving picture imaging apparatus according to the present invention comprises: an imaging device operable to take an image of an object to generate a moving picture; coding unit operable to selectively inter-code or intra-code data of each of a plurality of block lines of the moving picture, the inter-coding and intra-coding each involving quantization; a correction unit operable to correct (i) an amount of codes generated in one or more inter-coded block lines, using a first method, out of a predetermined number of coded block lines, and (ii) an amount of codes generated in one or more intra-coded block lines, using a second method, out of the predetermined number of coded block lines, the amount of codes generated in one or more inter-coded block lines that has been corrected by using the second method taking a smaller value than that corrected by using the first method; and a determining unit operable to determine a quantizer scale to be used in quantization of data of a next block line, when the coding unit is to inter-code the data of the next block line, based on a total of the amounts of codes generated in the intra-coded block lines and inter-coded block lines that have been corrected.

According to the above structure, it is possible to obtain the same effect as in the above described moving picture coding apparatus.

A moving picture coding method according to the present invention comprises: a coding step of selectively inter-coding or intra-coding data of each of a plurality of frames of a moving picture, the inter-coding and intra-coding each involving quantization; and a determining step of determining, based on an amount of codes generated in a first frame, a quantizer scale to be used in quantization of data of a second frame, wherein] when inter-coding the data of the second frame, the determination is done by using (i) a first method if data of the first frame has been inter-coded, or (ii) a second method if the data of the first frame has been intra-coded, the quantizer scale determined by using the second method taking a smaller value than that determined by using the first method.

Further, a moving picture coding method according to the present invention comprises: a coding step of selectively inter-coding or intra-coding data of each of a plurality of block lines of a moving picture, the inter-coding and intra-coding each involving quantization; a correction step of correcting (i) an amount of codes generated in one or more inter-coded block lines, using a first method, out of a predetermined number of coded block lines, and (ii) an amount of codes generated in one or more intra-coded block lines, using a second method, out of the predetermined number of coded block lines, the amount of codes generated in one or more inter-coded block lines that has been corrected by using the second method taking a smaller value than that corrected by using the first method; and a determining step of determining a quantizer scale to be used in quantization of data of a next block line, when inter-coding the data of the next block line, based on a total of the amounts of codes generated in the intra-coded block lines and inter-coded block lines that have been corrected.

According to the above structure, it is possible to obtain the same effect as in the above described moving picture coding apparatus.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 2 illustrates a structure of a moving picture imaging apparatus according to a first embodiment;

FIG. 3 shows an example of a detailed structure of a code correction unit 12;

FIG. 9 illustrates a structure of a moving picture imaging apparatus according to a third embodiment;

FIG. 21 shows an example of tables stored in a table storing unit 19;

DESCRIPTION OF THE PREFERRED EMBODIMENTS

Figure 1A:
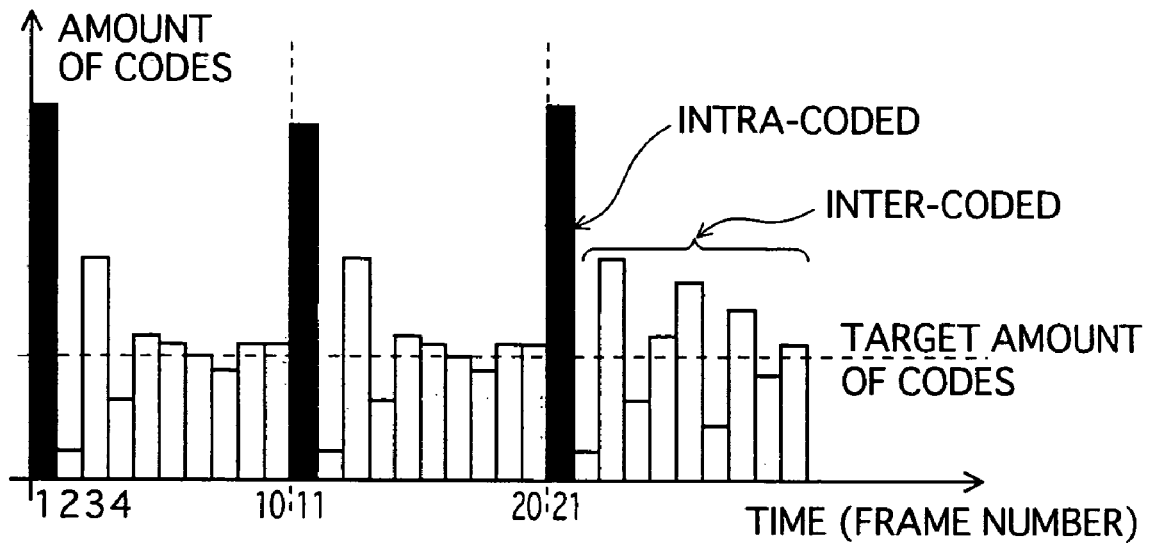
FIGS. 1A and 1B show diagrams showing shifts of an amount of codes generated in each frame and image quality in a conventional moving picture coding apparatus.

The following describes preferred embodiments of the present invention with reference to the drawings.

First Embodiment

[Structure]

FIG. 2 illustrates a structure of a moving picture imaging apparatus according to a first embodiment.

The moving picture imaging apparatus is provided with an imaging lens 1, an imaging sensor 2, a moving picture coding apparatus 31, a microcomputer 4, a program memory 5, and a video stream memory 6. The imaging lens 1 produces an image of an object on the imaging sensor 2. The imaging sensor 2 takes the image of the object to produce data of a moving picture. The moving picture coding apparatus 31 generates a video stream by compression coding of the data of the moving picture that has been produced by the imaging sensor 2. The microcomputer 4 controls the moving picture imaging apparatus as a whole according to a program stored in the program memory 5. The video stream memory 6 stores the video stream generated by the moving picture coding apparatus 31.

The moving picture coding apparatus 31 includes a coding unit 11, a code correction unit 12, and a quantizer scale determining unit 13.

The coding unit 11 is a so-called MPEG encoder that selectively inter-codes or intra-codes data for each frame of a moving picture. Examples of inter-coding include inter-frame predictive coding, discrete cosine transform (DCT), quantization, and variable length coding. Examples of intra-coding include intra-frame predictive coding, DCT, quantization, and variable length coding. The selection between inter-coding and intra-coding is done according to an instruction from the microcomputer 4. In the first embodiment, a case in which one frame out of ten frames is intra-coded, and the other nine frames are inter-coded is taken as an example.

A quantizer scale used in quantization of a frame is supplied from the quantizer scale determining unit 13.

The code correction unit 12 measures an amount of codes generated in each frame, and corrects the amount according to the following formula for correction (formulas 2 and 3).

When a frame n is intra-coded:

$$Cn'=Cn*P1 \quad \text{Formula 2}$$

When the frame n is inter-coded:

$$Cn'=Cn*P2 \quad \text{Formula 3}$$

In the above formulas, Cn is an amount of codes generated after coding the frame n, and P1 and P2 are correction coefficients whose relation is P1<P2. In the first embodiment, a case in which P1=P, where (0<P<1) and P2=1, is taken as an example. A correction coefficient P satisfies a formula 4 as follows.

$$P=Cinter/Cintra \quad \text{Formula 4}$$

In the formula, Cinter is an amount of codes generated when a given frame is inter-coded using a given quantizer scale, and Cintra is an amount of codes generated when the same frame is intra-coded using the same quantizer scale. The correction coefficient P is for converting the amount of codes generated when intra-coding into converting the amount of codes generated when inter-coding.

Generally speaking, the amount of codes generated by intra-coding a certain frame is about three to five times greater than the amount of codes generated by inter-coding the same frame. Consequently, the correction coefficient P in the first embodiment is given to be a fixed value falling in a range of ⅕ to ⅓, inclusive. Note that the code correction unit 12 identifies whether the frame is to be intra-coded or inter-coded according to the instruction from the microcomputer 4.

The quantizer scale determining unit 13 determines a quantizer scale to be used in quantization of a frame (n+1) according to formulas 5 and 6 below.

When a frame (n+1) is to be intra-coded:

$$Qp[n+1] = Qp\text{intra} \quad \text{Formula 5}$$

When the frame (n+1) is to be inter-coded:

$$Qp[n+1] = (Cn'/dstC) * Qp[n] \quad \text{Formula 6}$$

In the above formulas 5 and 6, Qpintra is a predetermined value, and dstC is a target amount of codes that is set in advance.

In the first embodiment, Qpintra is used as the quantizer scale when the frame (n+1) is to be intra-coded. When the frame (n+1) is to be inter-coded, the quantizer scale is determined based on Cn' and the quantizer scale Qp[n], where Cn' is an amount of codes corrected by the code correction unit 12.

The code correction unit 12 corrects the amount of codes generated in the frame n according to the formula 2 when the frame n is intra-coded, and according to the formula 3 when the frame n is inter-coded. The following describes an example of a structure for realizing the above.

FIG. 3 shows an example of a detailed structure of the code correction unit 12.

The code correction unit 12 includes a code measuring unit 121, a frame code memory 122, registers R1 and R2, a selector 1, and a multiplier M1.

The code measuring unit 121 measures the amount of codes Cn generated in the frame n that has been coded by the coding unit 11. The register R1 holds the correction coefficient P, and the register R2 holds a correction coefficient 1. The selector S1, according to the instruction from the microcomputer 4, gives the correction coefficient P to the multiplier M1 when the frame n is intra-coded, and gives the correction coefficient 1 to the multiplier M1 when the frame n is inter-coded.

The multiplier M1 multiplies the amount of generated codes Cn and the selected correction coefficient. The frame code memory 122 stores the result of the multiplication by the multiplier M1, and hands the result to the quantizer scale determining unit 13.

By the above structure, it is possible for the code correction unit 12 to output a corrected amount of codes Cn'=Cn*P when the frame n is intra-coded, and a corrected amount of codes Cn'=Cn when the frame n is inter-coded.

[Operation]

Figure 4:
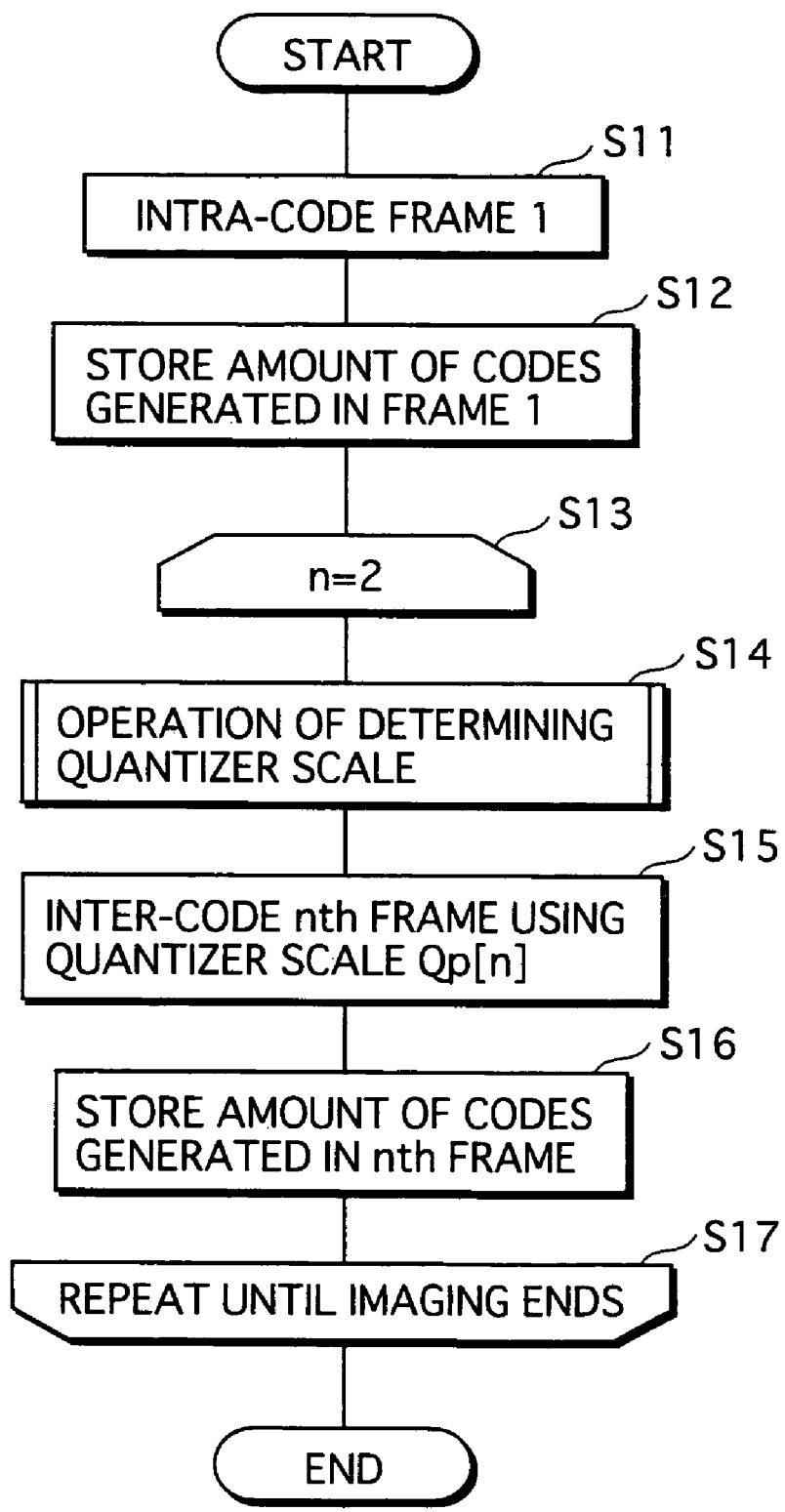
FIG. 4 is a diagram showing an operation of a moving picture coding apparatus 31 according to the first embodiment.

FIG. 4 is a diagram showing an operation of the moving picture coding apparatus 31 according to the first embodiment.

The moving picture coding apparatus 31 starts coding in response to the instruction from the microcomputer 4. First, the moving picture coding apparatus 31 intra-codes a frame 1 (Step S11). Because there is no preceding frame to the frame 1, the frame 1 is always intra-coded. As an initial value of the quantizer scale, Qpintra that is to be used when a frame is intra-coded is used. Then, the moving picture coding apparatus 31 stores an amount of codes generated in the frame 1 in the frame code memory 122 (Step S12). Because the frame 1 is intra-coded here, C1*P is stored in the frame code memory 122.

Next, the moving picture coding apparatus 31 determines a quantizer scale to be used for the frame 2 based on the amount of generated codes and the quantizer scale used for the frame 1 (Step S14). Then, the moving picture coding apparatus 31 inter-codes the frame 2 using the determined quantizer scale (Step S15).

The moving picture coding apparatus 31 stores an amount of codes generated in the frame 2 in the frame code memory 122 (Step S16). Because the frame 2 is inter-coded here, C2 is stored in the frame code memory 122. After this, the moving picture coding apparatus 31 repeats the operations from Step S13 through Step S17 until the microcomputer 4 instructs to stop imaging.

Figure 5:
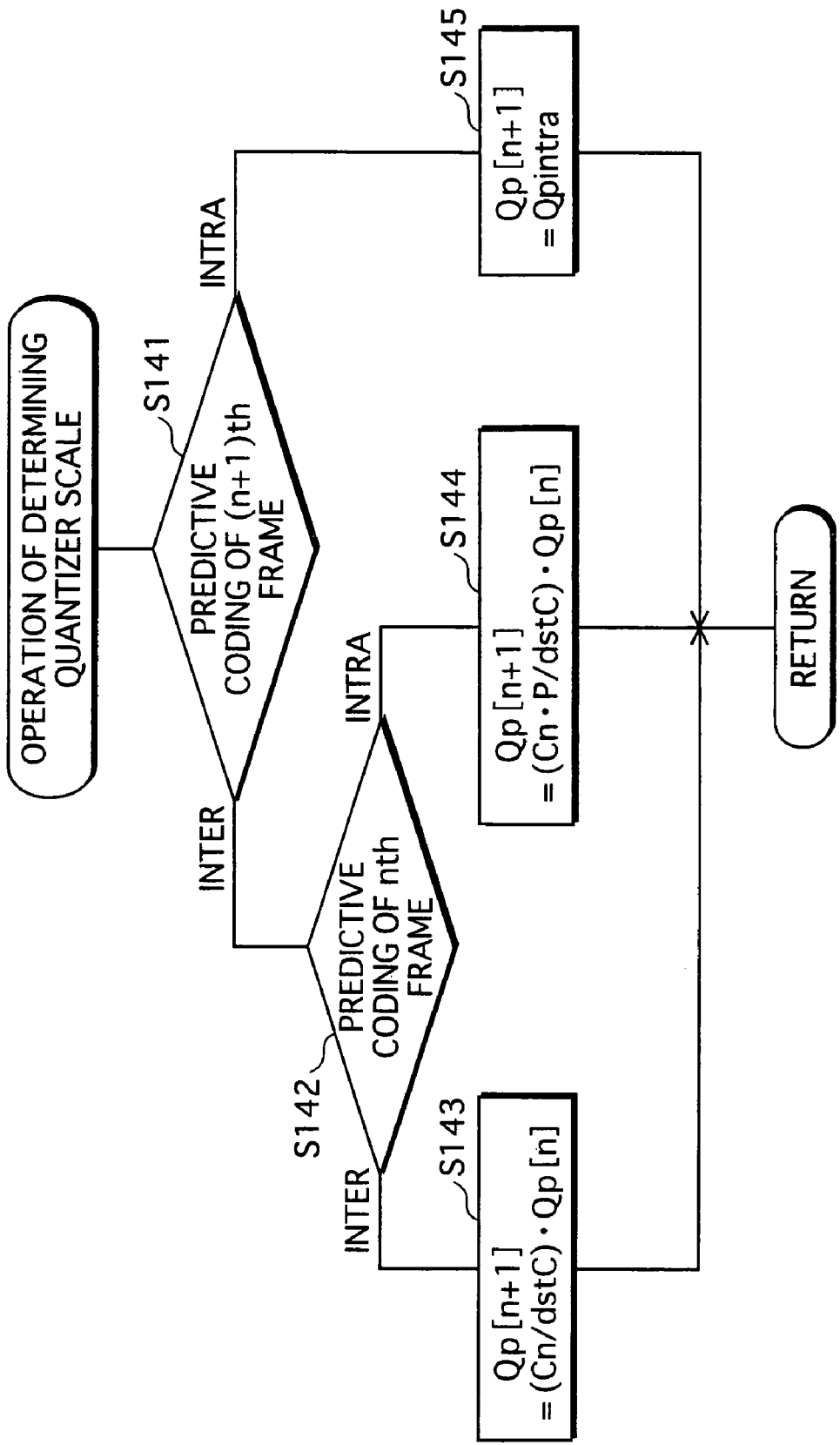
FIG. 5 is a diagram showing details of an operation of determining a quantizer scale according to the first embodiment.

FIG. 5 is a diagram showing details of the operation of determining the quantizer scale according to the first embodiment.

When the microcomputer 4 instructs to inter-code the frame (n+1) (Step S141: INTER) and the frame n has been inter-coded (Step S142: INTER), the moving picture coding apparatus 31 determines the quantizer scale Qp[n+1] to be used in quantization of the frame (n+1) to be (Cn/dstC)*Qp[n] (Step S143). When the frame n has been intra-coded (Step S142: INTRA), the moving picture coding apparatus 31 determines the quantizer scale Qp[n+1] to be used in quantization of the frame (n+1) to be (Cn*P/dstC)*Qp[n] (Step S144).

On the other hand, when the microcomputer 4 instructs to intra-code the frame (n+1) (Step S141: INTRA), the moving picture coding apparatus 31 determines the quantizer scale Qp[n+1] to be used in quantization of the frame (n+1) to be Qpintra (Step S145).

[Effect]

FIG. 6 show diagrams illustrating chronological shifts of the quantizer scale, the amount of codes generated in each frame, the image quality, and the total amount of generated codes according to the first embodiment.

The frames 1, 11, and 21 are intra-coded frames, and the other frames are inter-coded frames.

Figure 6A:
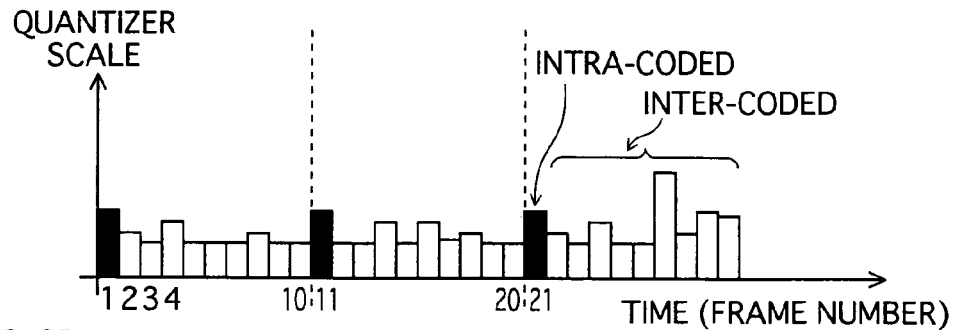
FIG. 6A to 6D show diagrams showing chronological shifts of the quantizer scale, the amount of codes generated in each frame, image quality, and a total amount of generated codes according to the first embodiment.

FIG. 6A indicates the quantizer scale. In the first embodiment, the quantizer scale for the intra-coded frames is set to be the fixed value Qpintra (See Step S145 in FIG. 5). Accordingly, as shown in FIG. 6A, the quantizer scales for the frames 1, 11, and 21 take the same value. Generally, the fixed value Qpintra is set so that the amount of codes generated in an intra-coded frame becomes larger than the target amount of codes for one frame. This is because the amount of codes generated in an intra-coded frame affects the image quality of an entire moving picture to a large extent, and making the amount of codes generated in the intra-coded frame causes deterioration in the image quality of the moving picture as a whole.

Figure 6B:
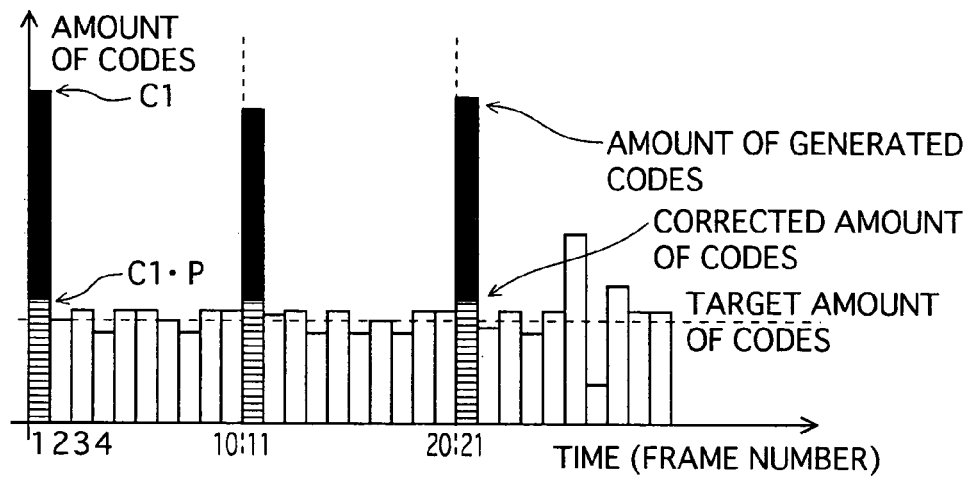

FIG. 6B indicates the amount of codes. An amount of generated codes C1 is much greater than the target amount of codes. The amount of corrected codes C1*P that is shown overlapped with the amount of generated codes C1 indicates the amount of codes corrected by the code correction unit 12. The amount of corrected codes C1*P is converted into an amount of codes generated by inter-coding, and becomes about the same size as the amount of codes generated in an inter-coded frame such as the frame 2. Therefore, the quantizer scale for the frame 2 becomes small in comparison with the case in which the amount of codes generated in the frame 1 is not corrected. As a result, the amount of codes generated in the frame 2 becomes larger in comparison to a case in which the quantizer scale for the frame is determined based on the amount of codes generated in the frame 1 without correction, and the amount of codes generated in the frame 2 is roughly the same amount as the target amount of codes for one frame. Because the amount of codes generated in the frame 2 roughly matches the target amount of codes for one frame, the amount of codes generated in the frames 3 to 10 shifts roughly around the target amount of codes. Hunting in the amount of codes generated in several inter-coded frames immediately after the intra-coded frame is suppressed in the above manner.

Figure 6C:
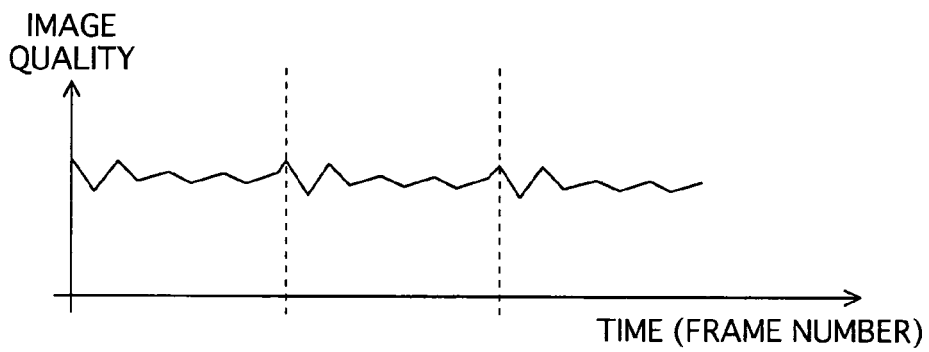

FIG. 6C indicates the image quality. The image quality becomes stable, because the hunting in the amount of codes generated in several inter-coded frames immediately after the intra-coded frame is suppressed as described above.

Figure 6D:
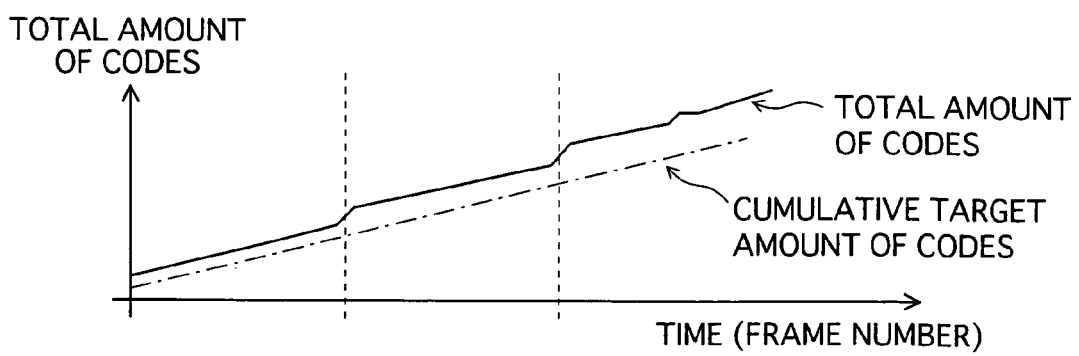

FIG. 6D indicates the total amount of codes. In the first embodiment, the quantizer scale for an intra-coded frame is the fixed value Qpintra. The fixed value Qpintra is set so that the amount of codes generated in the intra-coded frame becomes greater than the target amount of codes. Therefore, the total amount of codes becomes greater than a cumulative target amount of codes.

Second Embodiment

In the first embodiment, the fixed value Qpintra is used as the quantizer scale for the intra-coded frames. In a second embodiment, however, the quantizer scale for the intra-coded frames is also determined appropriately.

[Structure]

The moving picture coding apparatus according to the second embodiment has substantially the same structure as the moving picture coding apparatus according to the first embodiment. Accordingly, an explanation is also given referring to FIG. 2.

The code correction unit 12 measures an amount of codes generated in each frame, and then corrects the amount of generated codes according to correction formulas (formulas 7, 8, and 9) below.

When the frame (n+1) is to be inter-coded, and the frame n has been intra-coded:

$$Cn'=Cn*P1 \qquad \text{Formula 7}$$

When the frame (n+1) is to be inter-coded, and the frame n has been inter-coded:

$$Cn'=Cn*P2 \qquad \text{Formula 8}$$

When the frame (n+1) is to be intra-coded:

$$Cn'=Cn*P3 \qquad \text{Formula 9}$$

P1, P2, and P3 are correction coefficients and in a relation of P1<P2<P3. In the second embodiment, an example in which P1=P, where (0<P<1), P2=1, and P3=1/P is explained. The correction coefficient P is the coefficient that satisfies the formula 4.

The quantizer scale determining unit 13 determines the quantizer scale to be used in the frame (n+1), according to a formula 10 below.

$$Qp[n+1]=(Cn'/dstC)*Qp[n] \qquad \text{Formula 10}$$

[Operation]

Figure 7:
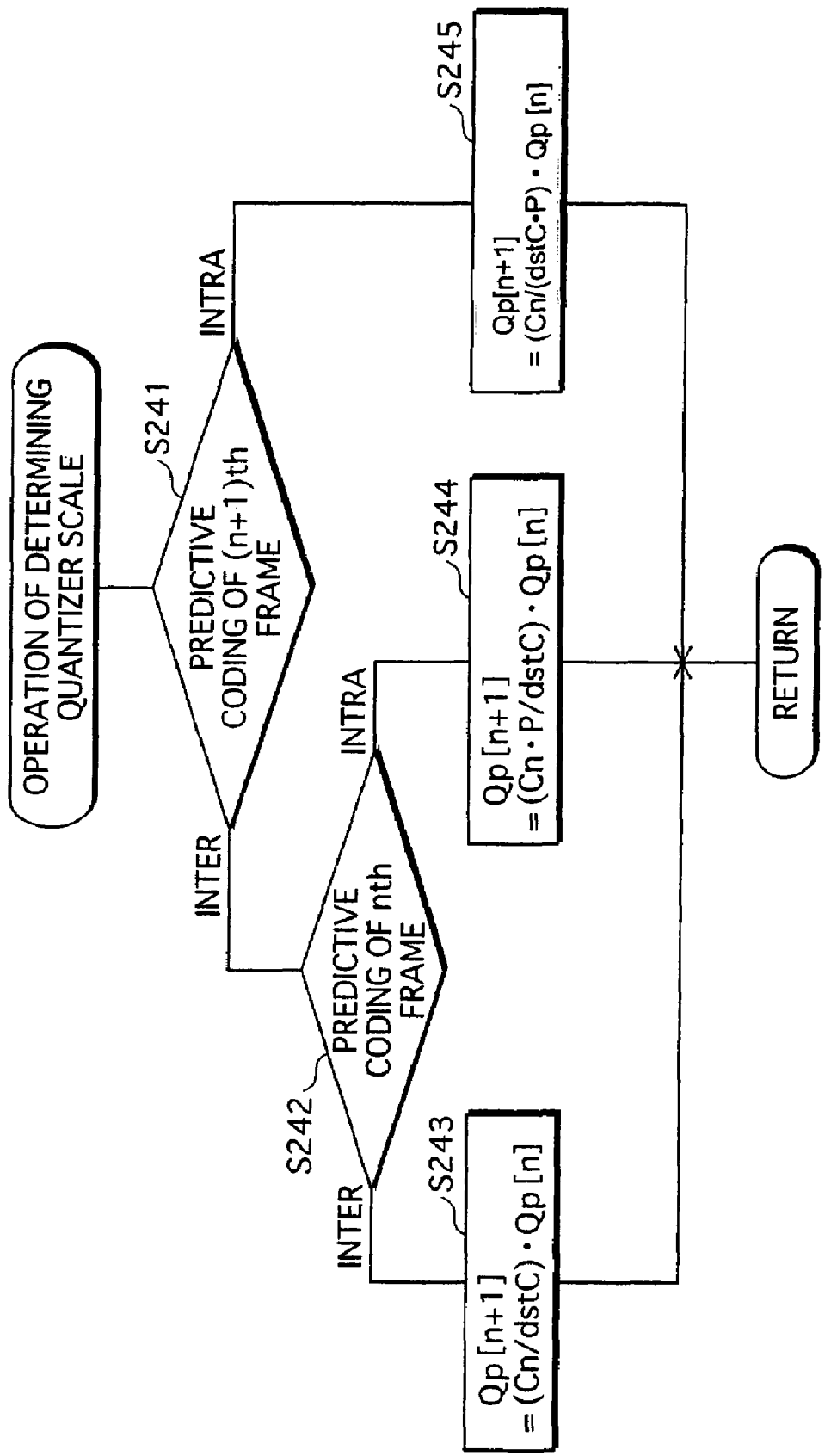
FIG. 7 is a diagram showing details of an operation of determining a quantizer scale according to a second embodiment.

FIG. 7 is a diagram showing details of the operation of determining the quantizer scale according to the second embodiment.

When the microcomputer 4 instructs to inter-code the frame (n+1) (Step S241: INTER) and the frame n has been inter-coded (Step S242: INTER), the moving picture coding apparatus 31 determines the quantizer scale Qp[n+1] to be used in quantization of the frame (n+1) to be (Cn/dstC)*Qp[n] (Step S243). On the other hand, when the frame n has been intra-coded (Step S242: INTRA), the moving picture coding apparatus 31 determines the quantizer scale Qp[n+1] to be used in quantization of the frame (n+1) to be (Cn*P/dstC)*Qp[n] (Step S244).

Moreover, when the microcomputer 4 instructs to use intra-coding for predictive coding of the frame (n+1) (Step S241: INTRA), the moving picture coding apparatus 31 determines the quantizer scale Qp[n+1] to be used in quantization of the frame (n+1) to be (Cn/(dstC*P))*Qp[n] (Step S245).

[Effect]

FIG. 8 show diagrams illustrating chronological shifts of the quantizer scale, the amount of codes generated in each frame, image quality, and a total amount of generated codes according to the second embodiment.

Figure 8A:
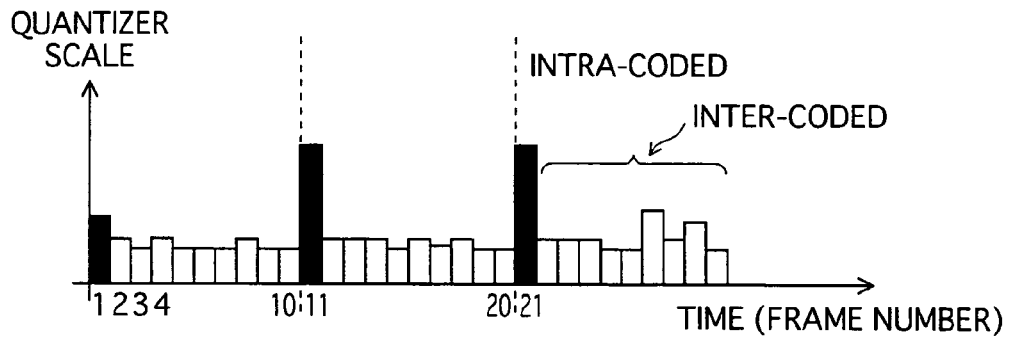
FIG. 8A to 8D show diagrams showing chronological shifts of the quantizer scale, the amount of codes generated in each frame, image quality, and a total amount of generated codes according to the second embodiment.

FIG. 8A indicates the quantizer scale. In the second embodiment, the quantizer scale for the intra-coded frames is determined appropriately (See Step S245 in FIG. 7). Accordingly, as shown in FIG. 8A, the quantizer scales for the frames 1, 11, and 21 do not take the same value. For example, the quantizer scale for the frame 11 is determined based on the amount of codes generated in the preceding frame 10. Because there is no preceding frame to the frame 1, a fixed value is given as an initial value of the quantizer scale for the frame 1.

Figure 8B:
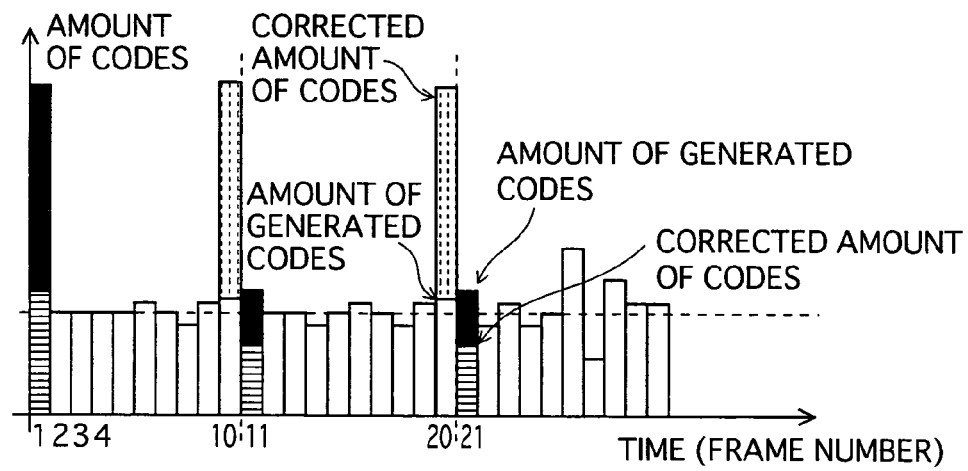

FIG. 8B indicates the amount of codes. The amount of codes generated in the frame 1 to the frame 10 is the same as in the first embodiment. The amount of codes generated in the intra-coded frames of the frame 11 and after is substantially the same as the target amount of codes.

Figure 8C:
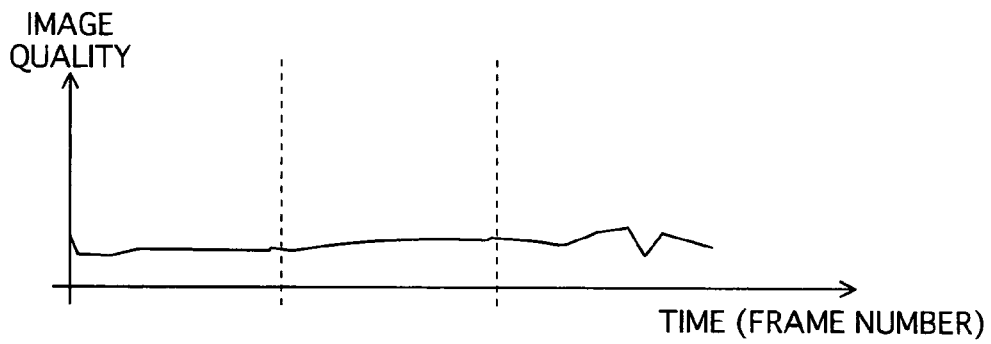

FIG. 8C indicates the image quality. The image quality becomes stable, because the hunting in the amount of generated codes is suppressed. However, because the amounts of codes generated in intra-coded frames (frame 11 and 21) are kept small, the image quality as a whole becomes deteriorated.

Figure 8D:
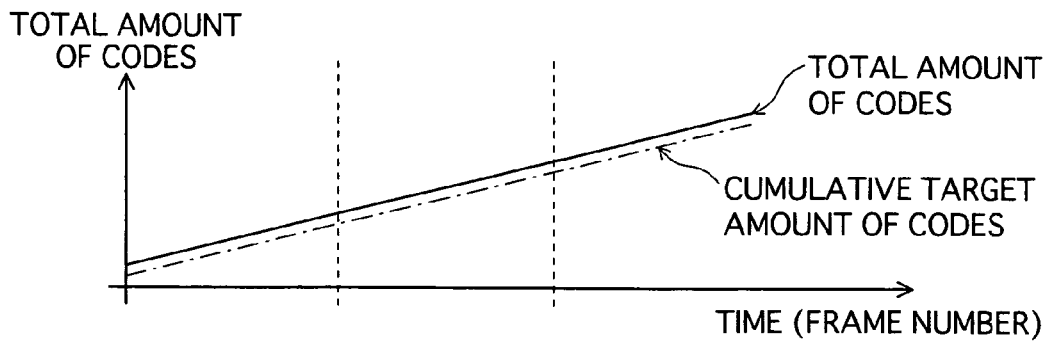

FIG. 8D indicates the total amount of codes. In the second embodiment, the quantizer scale for an intra-coded frame is determined appropriately so that the amount of codes generated in the intra-coded frame substantially matches the target amount of codes. Accordingly, the total amount of codes becomes closer to the cumulative target amount of codes.

Third Embodiment

In the first embodiment, the amount of codes generated in the intra-coded frame is set to be greater than the target amount of codes. As a result, the total amount of codes becomes greater than the cumulative target amount of codes.

In third embodiment, the following describes a technique with which the total amount of codes substantially matches the cumulative target amount of codes, with suppressing deterioration in the image quality as much as possible.

[Structure]

FIG. 9 illustrates a structure of the moving picture imaging apparatus according to the third embodiment.

The structure of a moving picture coding apparatus 33 according to the third embodiment is substantially the same as the moving picture coding apparatus 31 according to the first embodiment with addition of a difference calculation unit 14 and a target code correction unit 15. The same components as in the moving picture coding apparatus 31 are included in the moving picture coding apparatus of the third embodiment other than the difference calculation unit 14 and the target code correction unit 15. Therefore, the explanation about the same components is not given here.

When coding the frame (n+1), the difference calculation unit 14 calculates a cumulative difference IntC which is derived by deducting a total amount of target amounts of codes of the frame n and frames before the frame n from the total amount of codes generated in the frame n and frames before the frame n.

$$IntC = \Sigma(Cn - dstC) \quad \text{Formula 11}$$

When the cumulative difference is larger than 0, the target code correction unit 15 corrects the target amount of codes to be smaller as the cumulative difference is larger. When the cumulative difference is 0 or smaller, the target code correction unit 15 does not correct the target amount of codes. Specifically, the correction operation is performed according to formulas 12 and 13 as follows.

When IntC is larger than 0:

$$dstC' = dstC - IntC/d \quad \text{Formula 12}$$

When IntC is 0 or smaller:

$$dstC' = dstC \quad \text{Formula 13}$$

In the formulas, d is a parameter for adjustment that is predetermined to be larger than 1.

The quantizer scale determining unit 13 determines the quantizer scale to be used in quantization of the frame (n+1) according to formulas 14 and 15 as follows.

When the frame (n+1) is to be intra-coded:

$$Qp[n+1] = Qp\text{intra} \quad \text{Formula 14}$$

When the frame (n+1) is to be inter-coded:

$$Qp[n+1] = (Cn'/dstC')*Qp[n] \quad \text{Formula 15}$$

Note that the code correction unit 12 operates in the same way as in the first embodiment, and hands the corrected amount of codes Cn' to the quantizer scale determining unit 13.

The following describes an example of a structure for realizing the above the difference calculation unit 14 and the target code correction unit 15.

Figure 10:
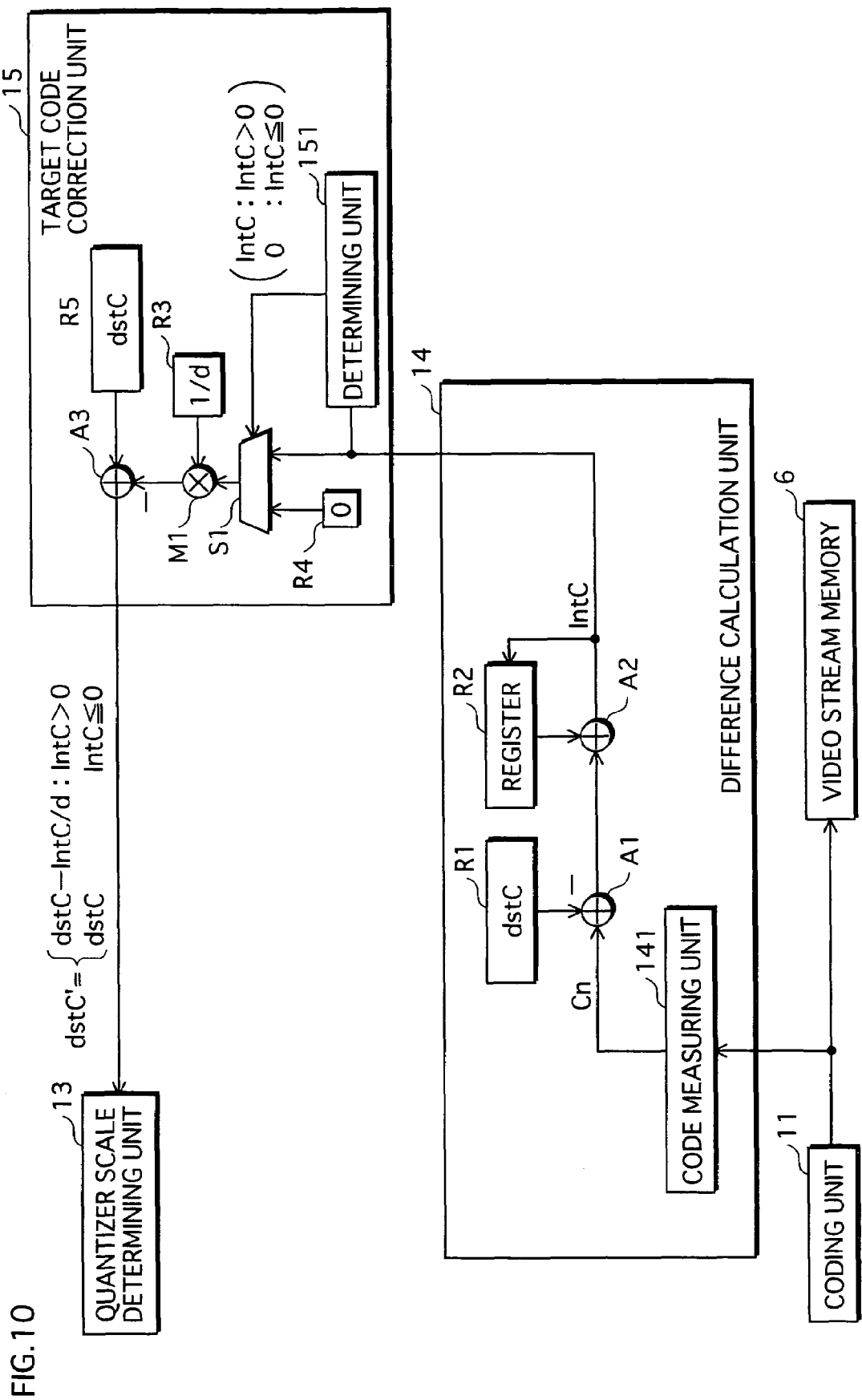
FIG. 10 shows an example of a detailed structure of a difference calculation unit 14 and a target code correction unit 15.

FIG. 10 shows an example of a detailed structure of the difference calculation unit 14 and the target code correction unit 15.

The difference calculation unit 14 includes a code measuring unit 141, the registers R1 and R2, and adders A1 and A2.

The code measuring unit 141 measures the amount of codes Cn generated in the frame n that has been coded by the coding unit 11. The register R1 holds the target amount of codes dstC, and the register R2 holds the cumulative difference of the frame n and the frames prior to the frame n.

At the adder A1, dstC is deducted from the amount of generated codes Cn. At the adder A2, (Cn−dstC) that is outputted from the adder A1 is added to the cumulative difference held in the register R2. The cumulative difference IntC outputted from the adder A2 is then held in the register R2, and outputted to the target code correction unit 15.

The target code correction unit 15 includes a determining unit 151, register R3, R4, and R5, the selector S1, and an adder A3.

The determining unit 151 determines whether or not the cumulative difference IntC is larger than 0, and then outputs the result to a control terminal of the selector S1.

According to the result of the judgment of the determining unit 151, the selector S1 hands the cumulative difference IntC to the multiplier M1 when IntC is larger than 0, and hands 0 held in the register R4 to the multiplier M1 when IntC is 0 or smaller.

The multiplier M1 multiplies the cumulative difference IntC and a parameter 1/d for adjustment. The adder A3 deducts the result of multiplication from the target amount of codes dstC held in the register R5, and outputs the result of the deduction to the quantizer scale determining unit 13.

By the above structure, it is possible for the target code correction unit 15 to realize the operation of correcting the target amount of codes to be smaller as the cumulative difference is larger when the cumulative difference is larger than 0, and not correcting the target amount of codes when the cumulative difference is 0 or smaller.

[Operation]

Figure 11:
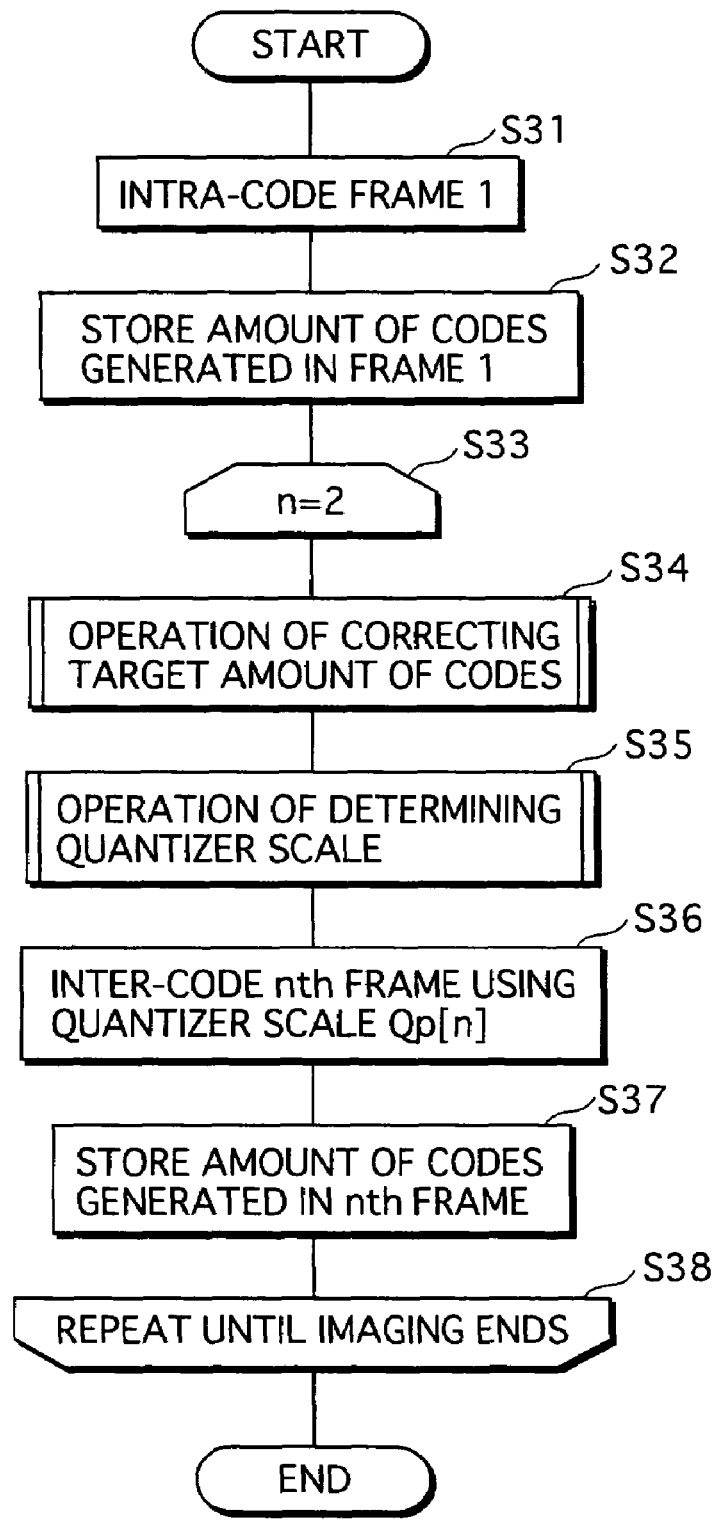
FIG. 11 shows an operation of a moving picture coding apparatus 33 according to the third embodiment.

FIG. 11 is a diagram showing an operation of the moving picture coding apparatus 33 according to the third embodiment.

The moving picture coding apparatus 33 starts coding in response to the instruction from the microcomputer 4. First, the moving picture coding apparatus 33 intra-codes the frame 1 (Step S31). Because there is no preceding frame to the frame 1, the frame 1 is always intra-coded. As an initial value of the quantizer scale, the third embodiment, Qpintra that is used when a frame is to be intra-coded is used. Then, the moving picture coding apparatus 33 stores the amount of codes generated in the frame 1 in the frame code memory 122 (Step S32). Because the frame 1 is intra-coded here, C1*P is stored in the frame code memory 122.

Next, the moving picture coding apparatus 33 corrects the target amount of codes (Step S34), and determines the quantizer scale for the frame 2 based on the amount of codes generated in the frame 1, the quantizer scale used for the frame 1, and the corrected target amount of codes (Step S35). Then the moving picture coding apparatus 33 inter-codes the frame 2 using the determined quantizer scale (Step S36).

The moving picture coding apparatus 33 stores the amount of codes generated in the frame 2 in the frame code memory 122 (Step S37). Because the frame 2 is inter-coded here, C2 is stored in the frame code memory 122. After this, the moving picture coding apparatus 33 repeats the operations from Step S33 through Step S38 until the microcomputer 4 instructs to stop imaging.

Figure 12:
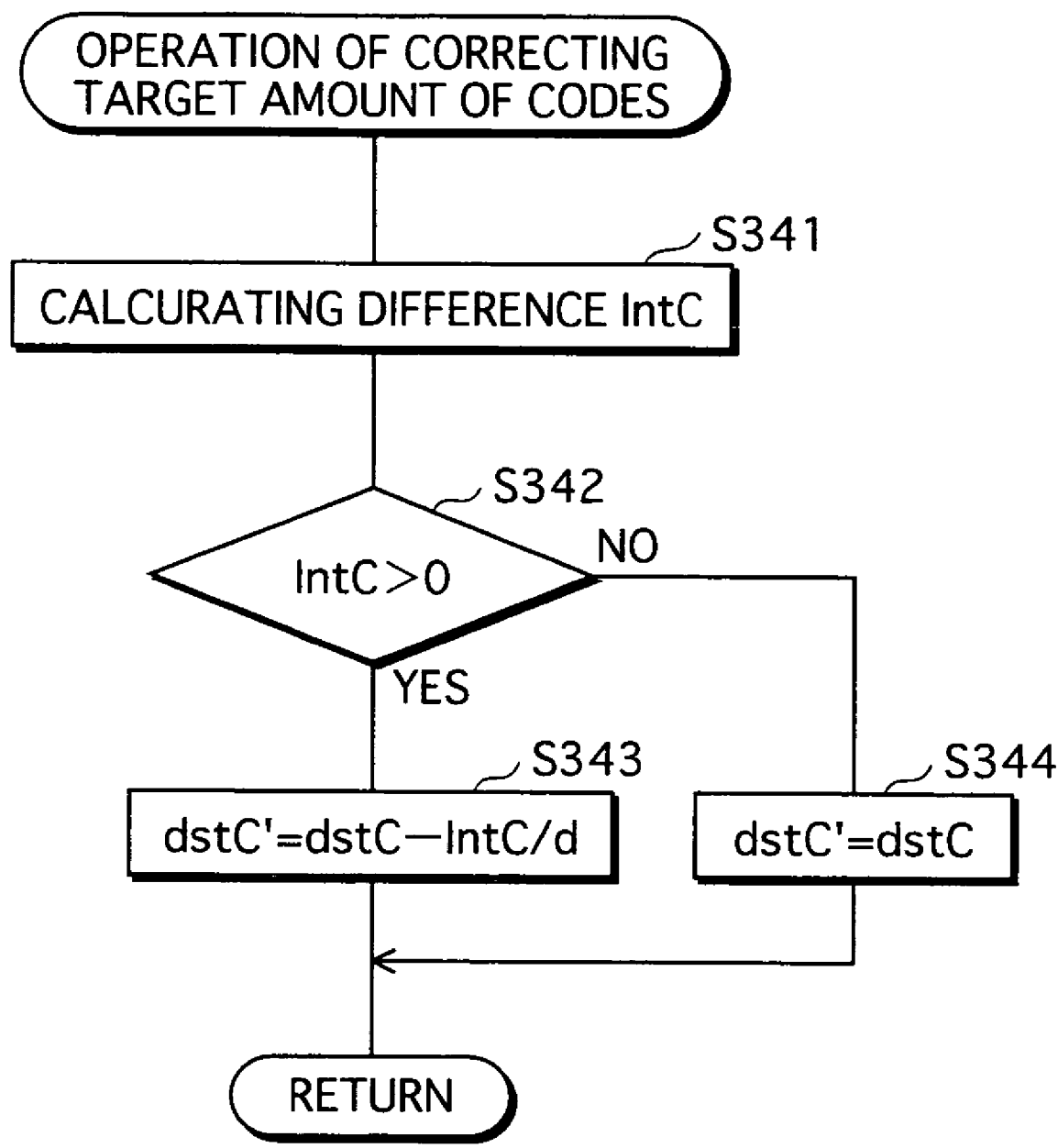
FIG. 12 shows a detail of an operation of correcting a target amount of codes according to the third embodiment.

FIG. 12 is a diagram showing details of the operation of correcting a target amount of codes according to the third embodiment.

The difference calculation unit 14 calculates the cumulative difference IntC (Step S341).

When the cumulative difference IntC is larger than 0 (Step S342: YES), the target code correction unit 15 corrects the target amount of codes to be dstC−IntC/d. When the cumulative difference IntC is 0 or smaller (Step S342: NO), the target code correction unit 15 does not correct target amount of codes and keeps dstC (Step S344).

The operation of determining the quantizer scale is substantially the same as the case of the first embodiment, and therefore not detailed here.

[Effect]

FIG. 13 show diagrams illustrating chronological shifts of the quantizer scale, the amount of codes generated in each frame, the image quality, and the total amount of generated codes according to the third embodiment.

Figure 13A:
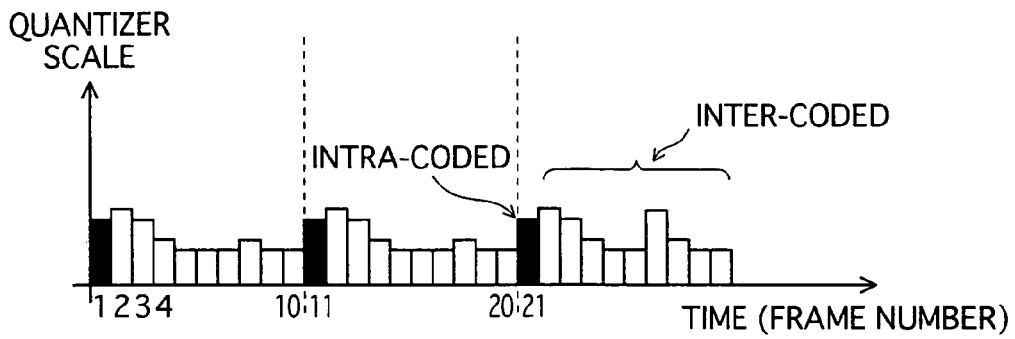
FIG. 13A to 13D show diagrams showing chronological shifts of the quantizer scale, the amount of codes generated in each frame, image quality, and a total amount of generated codes according to the third embodiment.

FIG. 13A indicates the quantizer scale. In the third embodiment, the quantizer scale for the intra-coded frames is set to be the fixed value Qpintra.

Figure 13B:
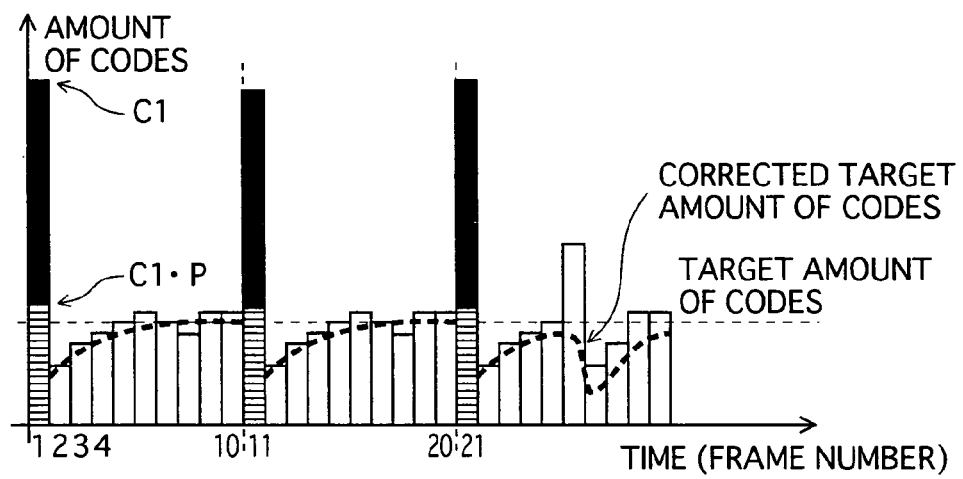

FIG. 13B indicates the amount of codes. The amount of codes C1 generated in the frame 1 is corrected to the amount of corrected codes C1*P. The target amount of codes dstC is corrected to the corrected target amount of codes dstC'. The corrected target amount of codes dstC' becomes smaller than the target amount of codes dstC by an amount that the amount of generated codes C1 exceeds the target amount of codes dstC.

The amount of codes C2 generated in the frame 2 roughly matches the corrected target amount of codes dstC'.

An amount of codes C3 generated in the frame 3 is closer to the target amount of codes dstC than the amount of codes C2 generated in the frame 2. This is because the cumulative difference IntC in the frame 3 is smaller than the cumulative difference IntC in the frame 2, and thus the corrected target amount of codes dstC' in the frame 3 becomes closer to the target amount of codes dstC than the case of the frame 2.

Moreover, in the third embodiment, it is possible to make the shift smooth even if the amount of codes in one frame increases drastically, because the cumulative difference IntC is used. This also applies to the frames that do not come soon after the intra-coded frame. For example, the amount of codes generated in a frame 26 increases drastically, but the shift in the amount of codes generated in the succeeding frames 27 and 28 is smooth.

Figure 13C:
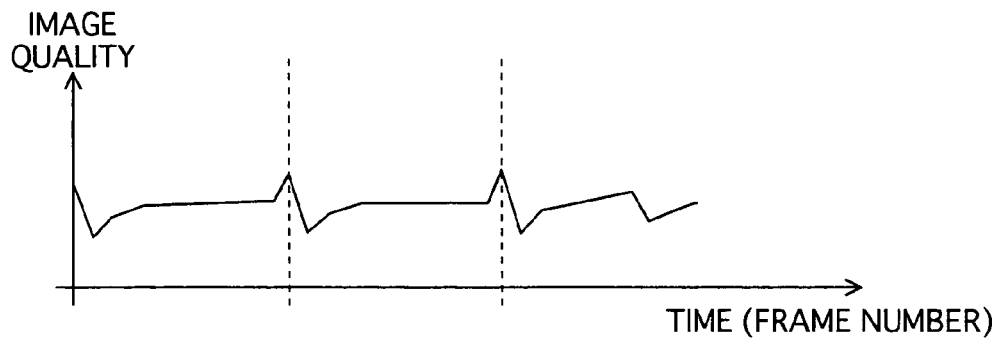

FIG. 13C indicates the image quality. The image quality becomes stable, because the hunting in the amount of codes generated in several inter-coded frames immediately after the intra-coded frame is suppressed. Further, because the amounts of codes generated in the inter-coded frames are the same as the case of the first embodiment, the image quality does not deteriorate to a large extent as in the second embodiment.

Figure 13D:
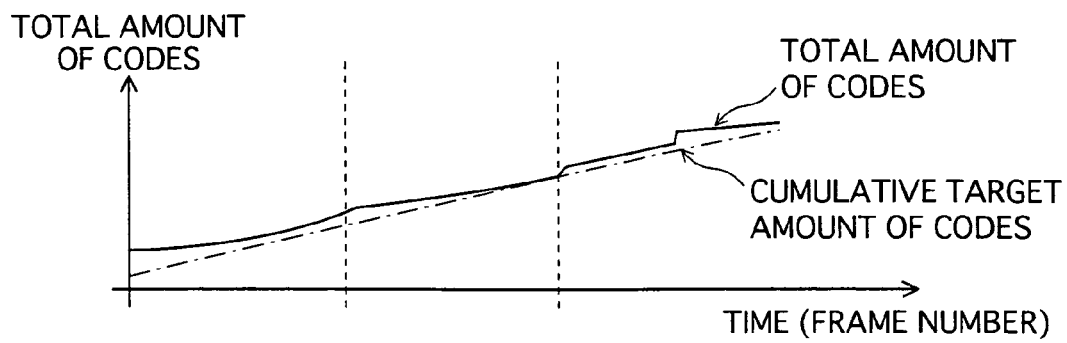

FIG. 13D indicates the total amount of codes. In the third embodiment, when the cumulative difference IntC is larger than 0, the target amount of codes is corrected to be smaller as the cumulative difference IntC becomes larger. Therefore, the total amount of codes becomes closer to the cumulative target amount of codes, because the amount of codes generated in the several frames after the intra-coded frame becomes smaller than the target amount of codes even if the amount of codes generated in the intra-coded frame exceeds the target amount of codes.

Fourth Embodiment

In a fourth embodiment, the quantizer scale for an intra-coded frame is determined by switching, according to a size of a free space in a buffer, between two modes: a first mode in which the quantizer scale is set to be the fixed value, and a second mode in which the quantizer scale is determined appropriately.

[Structure]

Figure 14:
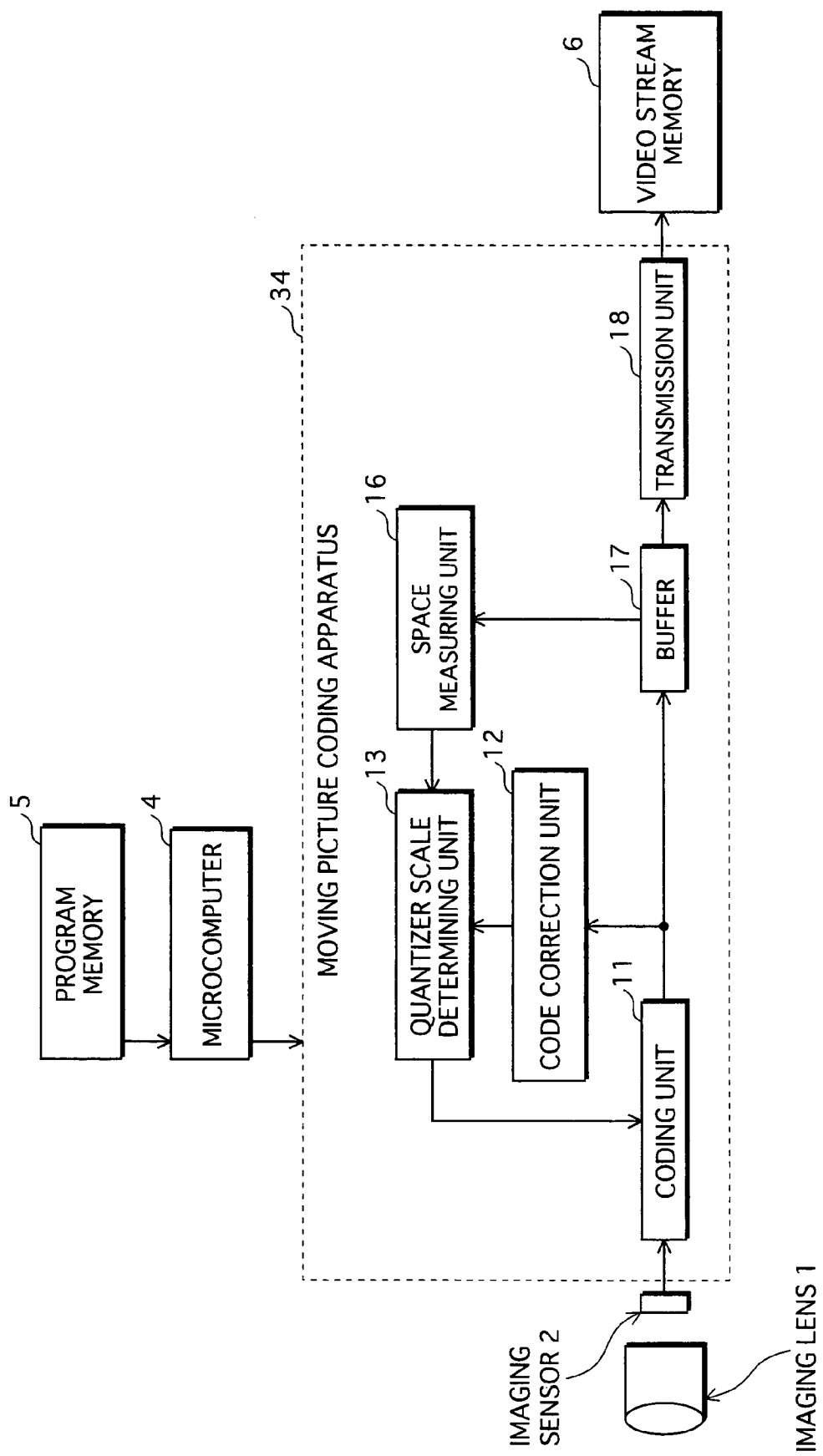
FIG. 14 illustrates a structure of the moving picture imaging apparatus according to a fourth embodiment.

FIG. 14 illustrates a structure of the moving picture coding apparatus according to the fourth embodiment.

A moving picture coding apparatus 34 according to the fourth embodiment has a structure in which a space measuring unit 16, a buffer 17, and a transmission unit 18 are added to the moving picture coding apparatus 31 according to the first embodiment. Other than the space measuring unit 16, the buffer 17, and the transmission unit 18, the moving picture coding apparatus 34 has substantially the same structure as the moving picture coding apparatus 31 according to the first embodiment, and therefore the explanation is not give here.

The space measuring unit 16 measures the size of the free space of the buffer 17, and notifies the quantizer scale determining unit 13 of the result of the measurement.

The buffer 17 temporarily stores the video stream generated by the coding unit 11. The transmission unit 18 transfers the video stream stored in the buffer 17 to the video stream memory 6.

The quantizer scale determining unit 13 determines the quantizer scale to be used in quantization of the frame (n+1) according to formulas 16 and 17 below.

When the frame (n+1) is to be intra-coded and the free space of the buffer 17 is larger than the predetermined size (e.g. 20% of the buffer):

$$Qp[n+1]=Qp\text{intra} \hspace{2cm} \text{Formula 16}$$

When the frame (n+1) is to be intra-coded and the free space of the buffer 17 is the predetermined size or smaller, or when the frame (n+1) is to be inter-coded:

$$Qp[n+1]=(Cn'/dstC)*Qp[n] \hspace{2cm} \text{Formula 17}$$

In the above formulas, Cn' is the same as in the formulas 7, 8, and 9.

The above described indicates that when the free space of the buffer 17 is larger than the predetermined size, the operation is performed in the first mode which is the same operation as in the first embodiment, and when free space of the buffer 17 is the predetermined size or smaller, the operation is performed in the second mode which is the same operation as in the second embodiment.

[Operation]

Figure 15:
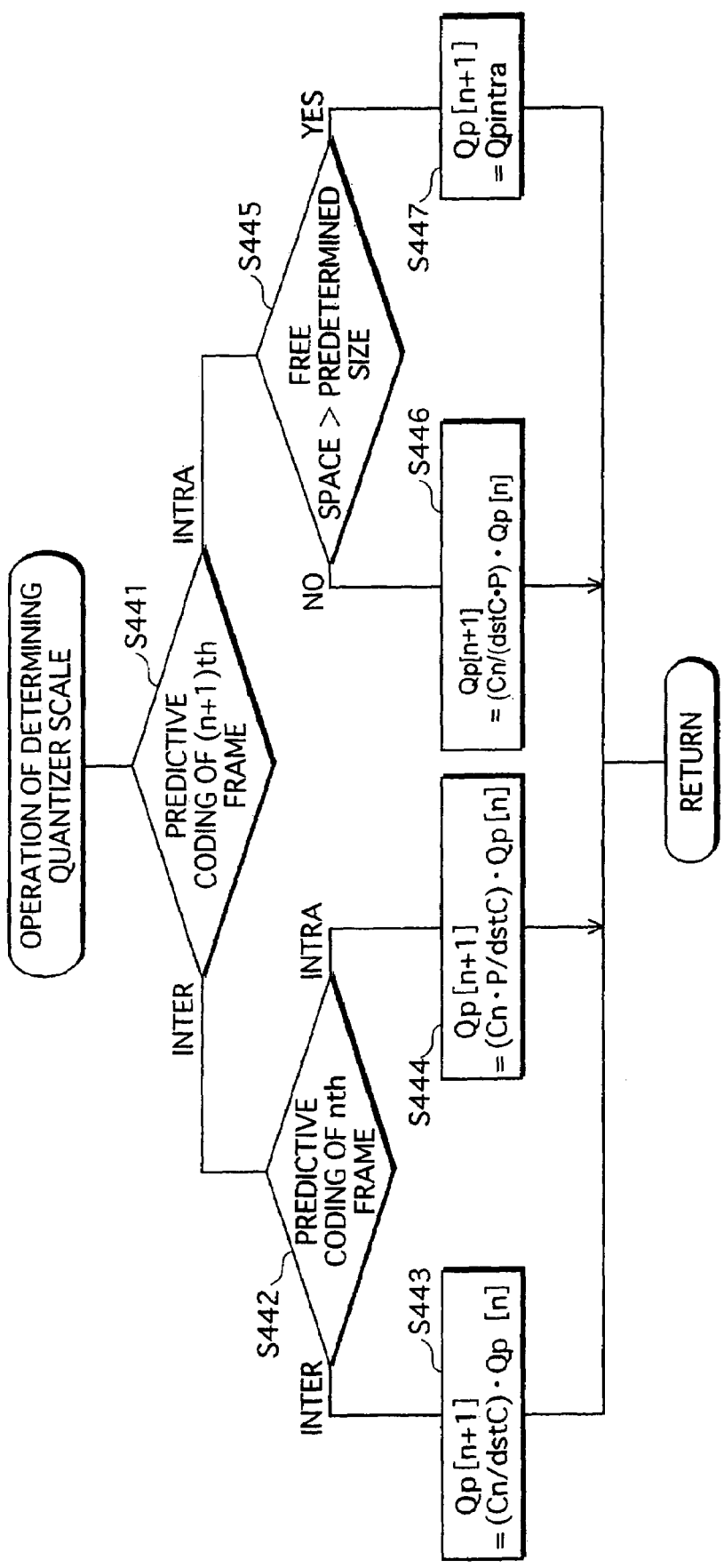
FIG. 15 is a diagram showing details of an operation of determining a quantizer scale according to the fourth embodiment.

FIG. 15 is a diagram showing details of the operation of determining the quantizer scale according to a fourth embodiment.

When the microcomputer 4 instructs to inter-code the frame (n+1) (Step S441: INTER) and the frame n has been inter-coded (Step S442: INTER), the moving picture coding apparatus 34 determines the quantizer scale Qp[n+1] to be used in quantization of the frame (n+1) to be (Cn/dstC)*Qp[n] (Step S443). On the other hand, when the frame n has been intra-coded (Step S442: INTRA), the moving picture coding apparatus 34 determines the quantizer scale Qp[n+1] to be used in quantization of the frame (n+1) to be (Cn*P/dstC)*Qp[n] (Step S444).

Moreover, when the microcomputer 4 instructs to intra-code the frame (n+1) (Step S441: INTRA) and the free space is the predetermined size or smaller (Step S445: NO), the moving picture coding apparatus 34 determines the quantizer scale Qp[n+1] to be used in quantization of the frame (n+1) to be (Cn/(dstC*P))*Qp[n] (Step S446). If the free space is larger than the predetermined size (Step S445: YES), then the moving picture coding apparatus 34 determines the quantizer scale Qp[n+1] to be used in quantization of the frame (n+1) to be Qpintra (Step S447).

[Effect]

When the quantizer scale used in quantization of an intra-coded frame takes the fixed value, it is not possible to adjust the amount of codes generated in the intra-coded frame even if the buffer is almost overflowing. However, the amount of codes generated in the intra-coded frame can be suppressed to be small if the quantizer scale used in quantization of the intra-coded frame is determined appropriately.

Thus, the present invention has an advantageous effect in reducing the possibility of overflowing of the buffer by appropriately determining the quantizer scale to be used in quantization of the intra-coded frame if the buffer is about to overflow.

Fifth Embodiment

In a fifth embodiment, the quantizer scale for an intra-coded frame is determined by switching, according to the size of the free space in the buffer, between two modes: a first mode in which the target amount of codes is not corrected, and a second mode in which the target amount of codes is corrected.

[Structure]

Figure 16:
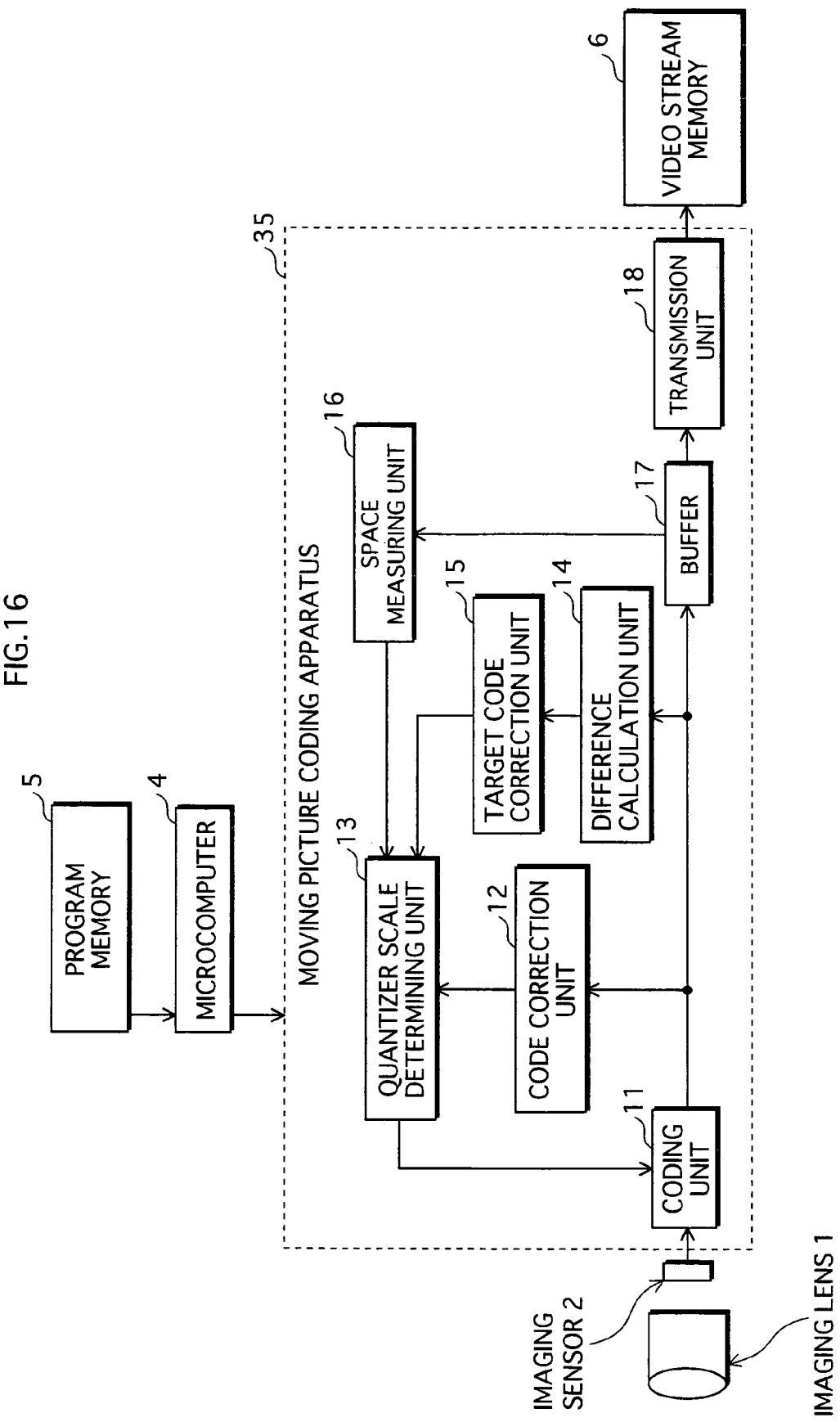
FIG. 16 illustrates a structure of a moving picture imaging apparatus according to a fifth embodiment.

FIG. 16 illustrates a structure of the moving picture coding apparatus according to the fifth embodiment.

A moving picture coding apparatus 35 according to the fifth embodiment has a structure in which the space measuring unit 16, the buffer 17, and the transmission unit 18 are added to the moving picture coding apparatus 33 according to the third embodiment. Other than the space measuring unit 16, the buffer 17, and the transmission unit 18, the moving picture coding apparatus 35 has substantially the same structure as the moving picture coding apparatus 33 according to the third embodiment, and therefore the explanation is not give here.

The space measuring unit 16, the buffer 17, and the transmission unit 18 are the same as in the fourth embodiment.

The quantizer scale determining unit 13 determines the quantizer scale to be used in quantization of the frame (n+1) according to formulas 18, 19, and 20 below.

When the frame (n+1) is to be intra-coded:

$$Qp[n+1]=Qp\text{intra} \qquad \text{Formula 18}$$

When the frame (n+1) is to be inter-coded and the free space of the buffer 17 is larger than the predetermined size:

$$Qp[n+1]=(Cn'/dstC)*Qp[n] \qquad \text{Formula 19}$$

When the frame (n+1) is to be inter-coded and the free space of the buffer 17 is the predetermined size or smaller:

$$Qp[n+1]=(Cn'/dstC')*Qp[n] \qquad \text{Formula 20}$$

In the above formulas, $Cn'$ is the same as in the formulas 7, 8, and 9, and $dstC'$ is the same as in the formulas 12 and 13.

The above described indicates that when the free space of the buffer 17 is larger than the predetermined size, the operation is performed in the first mode which is the same operation as in the first embodiment, and when free space of the buffer 17 is the predetermined size or smaller, the operation is performed in the second mode which is the same operation as in the third embodiment.

[Operation]

Figure 17:
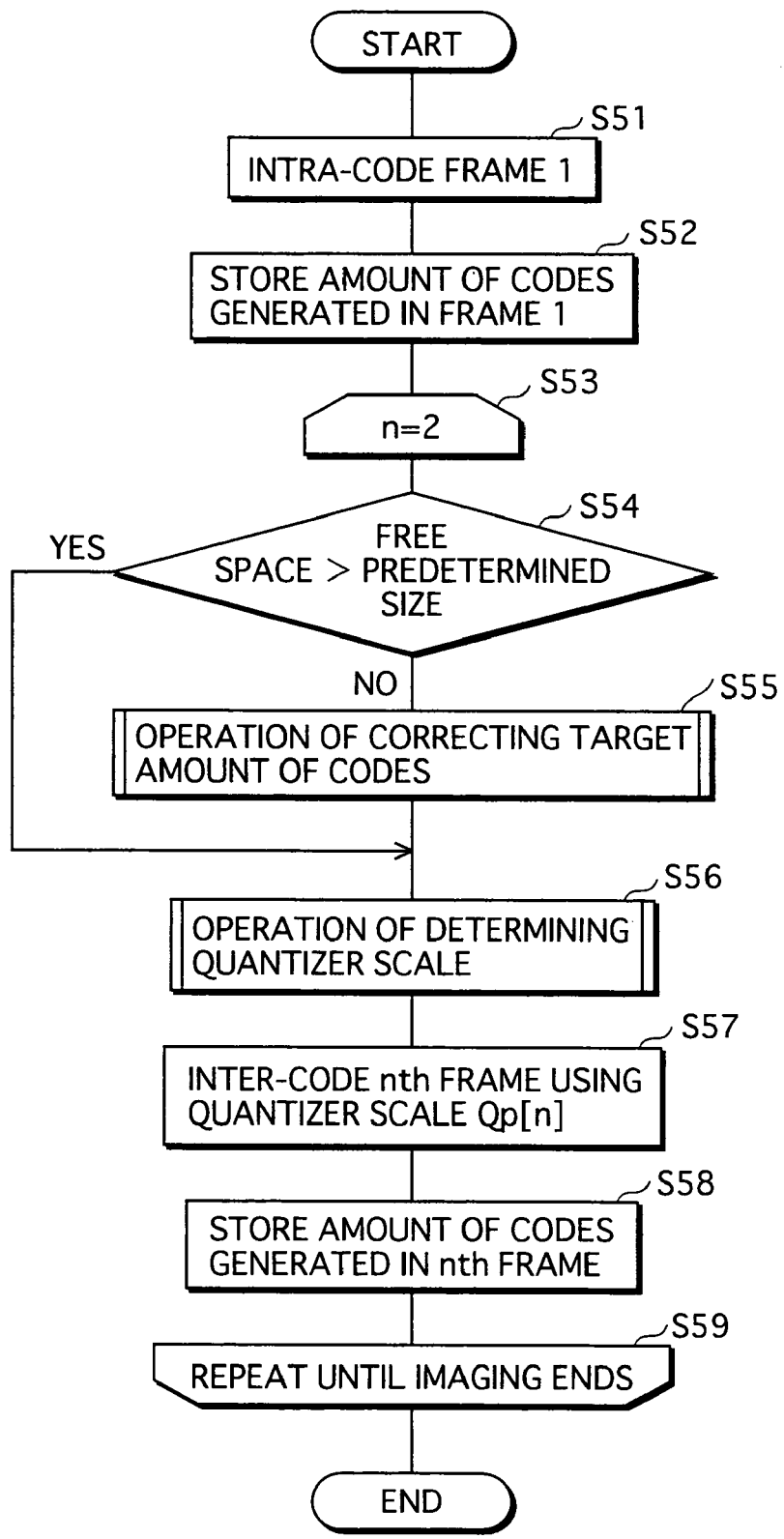
FIG. 17 shows an operation of a moving picture coding apparatus 35 according to the fifth embodiment.

FIG. 17 shows an operation of the moving picture coding apparatus 35 according to the fifth embodiment.

The moving picture coding apparatus 35 starts coding in response to the instruction from the microcomputer 4. First, the moving picture coding apparatus 35 intra-codes the frame 1 (Step S51). Because there is no preceding frame to the frame 1, the frame 1 is always intra-coded. In the fifth embodiment, Qpintra that is to be used when a frame is intra-coded is used as the initial value of the quantizer scale. Then, the moving picture coding apparatus 35 stores the amount of codes generated in the frame 1 in the frame code memory 122 (Step S52). Because the frame 1 is intra-coded here, C1*P is stored in the frame code memory 122.

When the free space is the predetermined size or smaller (Step S54: NO), the moving picture coding apparatus 35 corrects the target amount of codes (Step S55), and when the free space is larger than the predetermined size (Step S54: YES), then the moving picture coding apparatus 35 skips the Step 55 for correcting the target amount of codes.

The moving picture coding apparatus 35 determines the quantizer scale to be used in the frame 2 based on the obtained target amount of codes (Step S56). Then, the moving picture coding apparatus 35 inter-codes the frame 2 using the determined quantizer scale (Step S57).

The moving picture coding apparatus 35 stores the amount of codes generated in the frame 2 in the frame code memory 122 (Step S58). Because the frame 2 is inter-coded here, C2 is stored in the frame code memory 122. After this, the moving picture coding apparatus 35 repeats the operations from Step S53 through Step S59 until the microcomputer 4 instructs to stop imaging.

[Effect]

The moving picture coding apparatus according to the fifth embodiment corrects the amount of codes generated in the frame (n+1) according to an excess amount in the frame n and the frames preceding the frame n when the buffer is about to overflow. Thus, it is possible to reduce the possibility of overflowing of the buffer.

Sixth Embodiment

In a sixth embodiment, when the frame (n+1) is intra-coded, the quantizer scale is determined based on the quantizer scale used in the frame n. This is the only difference from the first embodiment. The rest is the same as the first embodiment, and therefore not explained here.

[Structure]

The code correction unit 12 does not correct the amount of generated codes if the frame (n+1) is to be intra-coded.

The quantizer scale determining unit 13 determines the quantizer scale to be used in quantization of the frame (n+1) according to formulas 21, 22, and 23 below.

When the frame (n+1) is to be inter-coded:

$$Qp[n+1]=(Cn'/dstC)*Qp[n] \qquad \text{Formula 21}$$

When the frame (n+1) is to be intra-coded and the frame n has been inter-coded:

$$Qp[n+1]=Pq1*Qp[n] \qquad \text{Formula 22}$$

When the frame (n+1) is to be intra-coded and the frame n has been intra-coded:

$$Qp[n+1]=Pq2*Qp[n] \qquad \text{Formula 23}$$

Here, Pq1, and Pq2 are predetermined coefficients. Specifically, the both coefficients are set within a range of 5/4 to 4/3.

As the coefficients Pq1 and Pq2 become larger, the effect of suppressing the amount of codes generated in the intra-coded frames becomes higher. However, this also causes deterioration of the image quality. A result of a simulation makes it clear that it is possible to obtain both the effect of suppressing the amount of codes generated in the intra-coded frames and an excellent image quality by setting the coefficients Pq1 and Pq2 in the range of 5/4 to 4/3.

[Operation]

Figure 18:
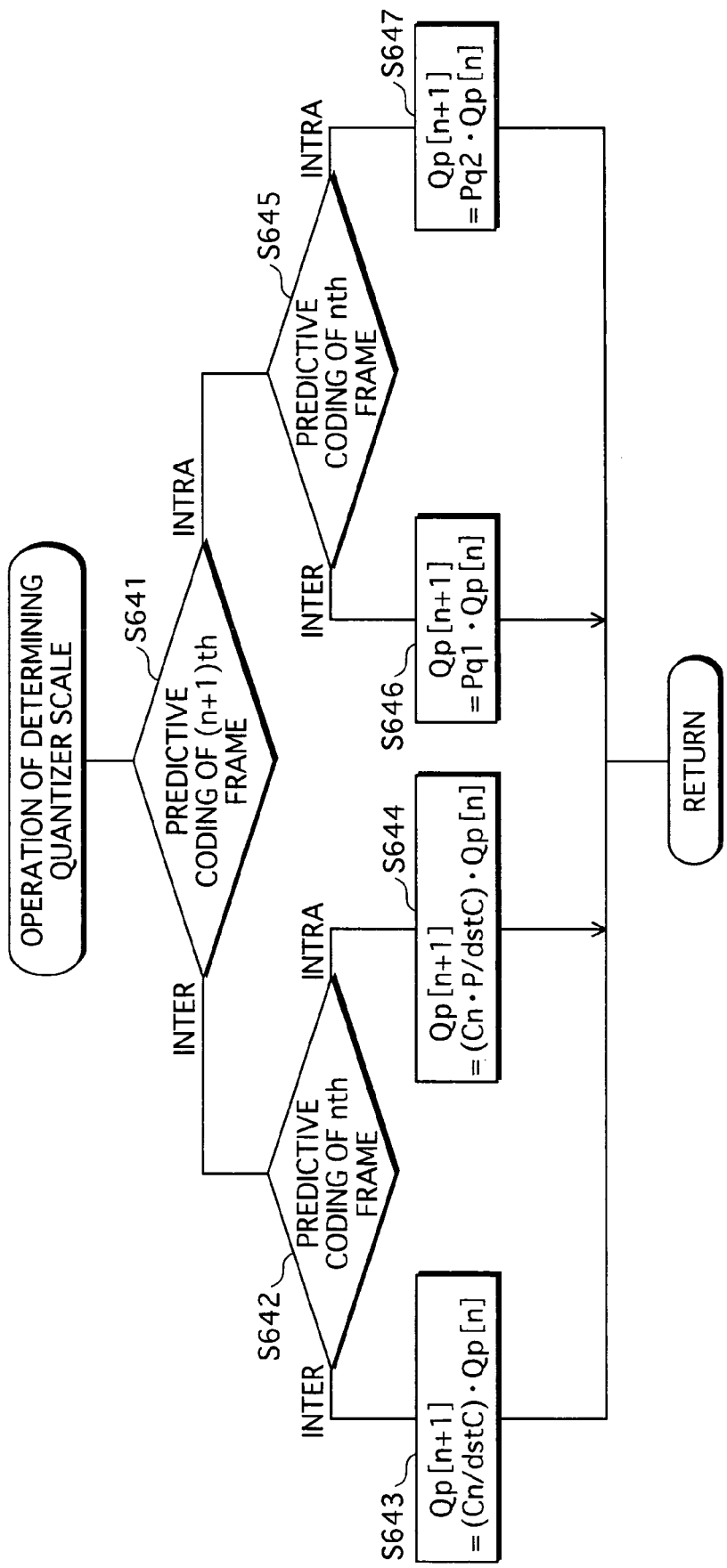
FIG. 18 is a diagram showing details of an operation of determining a quantizer scale according to a sixth embodiment.

FIG. 18 is a diagram showing details of an operation of determining the quantizer scale according to the sixth embodiment.

When the microcomputer 4 instructs to inter-code the frame (n+1) (Step S641: INTER) and the frame n has been inter-coded (Step S642: INTER), the moving picture coding apparatus 31 determines the quantizer scale Qp[n+1] to be used in quantization of the frame (n+1) to (Cn/dstC)*Qp[n] (Step S643). If the frame n has been intra-coded (Step S642: INTRA), the moving picture coding apparatus 31 determines the quantizer scale Qp[n+1] to be used in quantization of the frame (n+1) to be (Cn*P/dstC)*Qp[n] (Step S644).

Moreover, when the microcomputer 4 instructs to intra-code the frame (n+1) (Step S641: INTRA) and the frame n has been inter-coded (Step S645: INTER), the moving picture coding apparatus 31 determines the quantizer scale Qp[n+1] to be used in quantization of the frame (n+1) to be Pq1*Qp[n] (Step S646). If the frame n has been intra-coded (Step S645: INTRA), the moving picture coding apparatus 31 determines the quantizer scale Qp[n+1] to be used in quantization of the frame (n+1) to be Pq2*Qp[n] (Step S647).

[Effect]

FIG. 19 show diagrams showing chronological shifts of the quantizer scale, the amount of codes generated in each frame, and image quality according to the sixth embodiment.

Figure 19A:
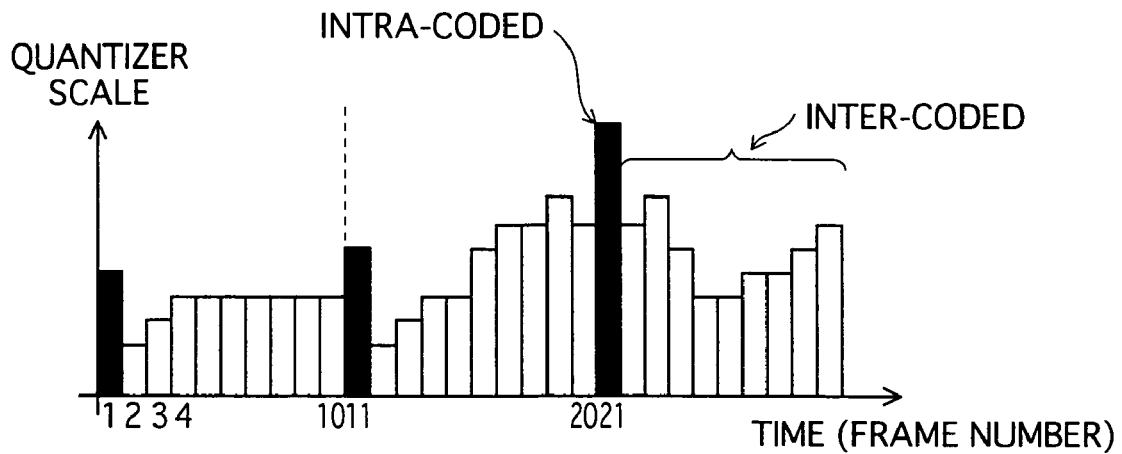
FIG. 19A to 19C show diagrams showing chronological shift of the quantizer scale, the amount of codes generated in each frame, and image quality according to the sixth embodiment.

FIG. 19A indicates the quantizer scale. In the sixth embodiment, the quantizer scale for the intra-coded frames is determined appropriately (See Step S645 in FIG. 18). Accordingly, as shown in FIG. 19A, the quantizer scales for the frames 1, 11, and 21 do not take the same value. For example, the quantizer scale for the frame 11 is determined based on the quantizer scale in the preceding frame 10. Because there is no frame preceding the frame 1, a fixed value is given as the initial value of the quantizer scale for the frame 1.

Figure 19B:
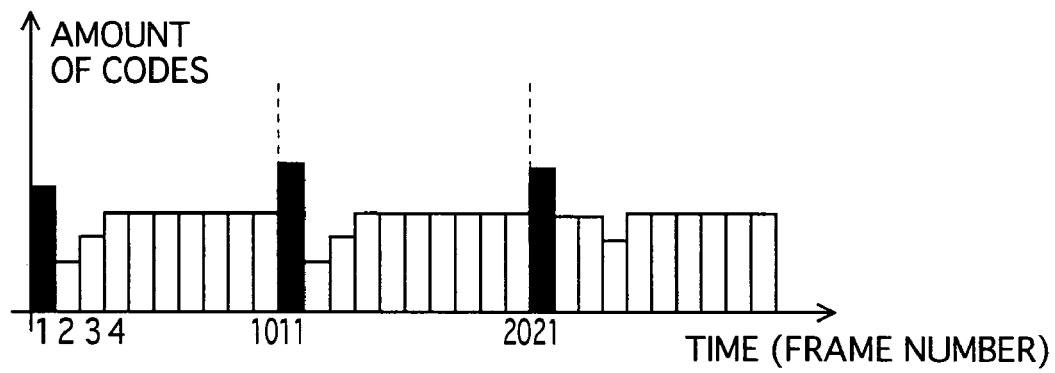

FIG. 19B indicates the amount of codes. The amount of codes generated in the frame 1 to the frame 10 is the same as in the first embodiment. The amount of codes generated in each of the intra-coded frames of the frame 11 and after is substantially the same as the target amount of codes.

Figure 19C:
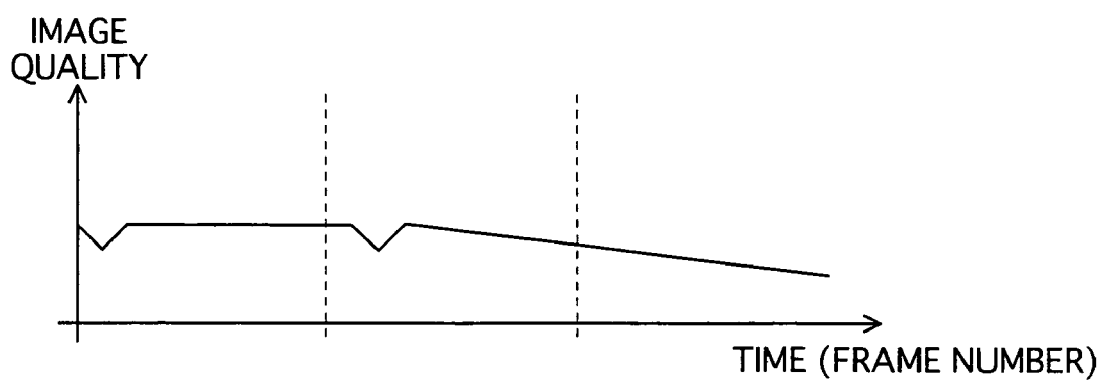

FIG. 19C indicates the image quality. The image quality becomes stable, because the hunting in the amount of generated codes is suppressed. However, because the amounts of codes generated in intra-coded frames (frame 11 and 21) are kept small, the image quality as a whole becomes deteriorated.

The shift in the total amount of codes in the sixth embodiment is substantially the same as in the second embodiment, and therefore not explained here.

In the sixth embodiment, when intra-coding, the quantizer scale is adaptively determined. Therefore, as in the second embodiment, it is possible to obtain the effect that the image quality and the amount of codes become stable.

Further in the sixth embodiment, when the intra-coding, the quantizer scale is determined regardless of the amount of codes generated in a immediately preceding frame. Therefore, it is possible to reduce the processing load in the operation of the moving picture coding apparatus in comparison with the case of the second embodiment.

Seventh Embodiment

In a seventh embodiment, when the frame (n+1) is intra-coded, the quantizer scale is determined based on the quantizer scale used in the frame n. This is the only difference from the first embodiment. The rest is the same as the first embodiment, and therefore not explained here.

[Structure]

Figure 20:
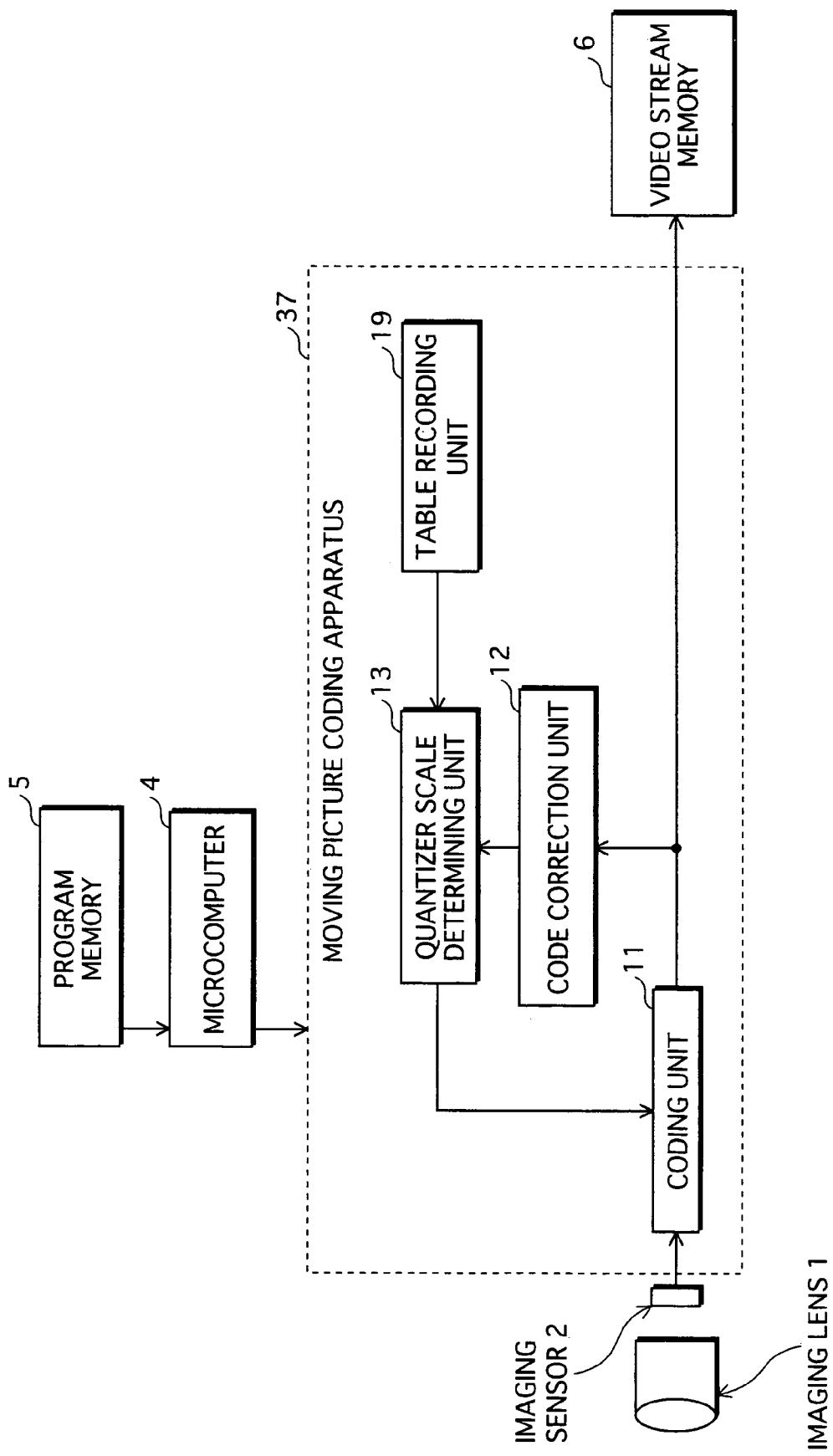
FIG. 20 illustrates a structure of a moving picture imaging apparatus according to a seventh embodiment.

FIG. 20 illustrates a structure of the moving picture imaging apparatus according to the seventh embodiment.

A moving picture coding apparatus 37 includes the coding unit 11, the code correction unit 12, the quantizer scale determining unit 13 and a table storing unit 19.

The table storing unit 19 stores a table showing correspondence between the quantizer scale for the frame n and the quantizer scale of the frame (n+1).

When the frame (n+1) is to be intra-coded, the quantizer scale determining unit 13 refers to the table stored in the table storing unit 19 to determine the quantizer scale for the frame (n+1) based on the quantizer scale for of the frame n.

FIG. 21 shows an example of a table stored in the table storing unit 19.

When the frame n is inter-coded, the quantizer scale for the frame (n+1) is determined to be Qnew1. When the frame n is intra-coded, the quantizer scale for the frame (n+1) is determined to be Qnew2.

[Operation]

Figure 22:
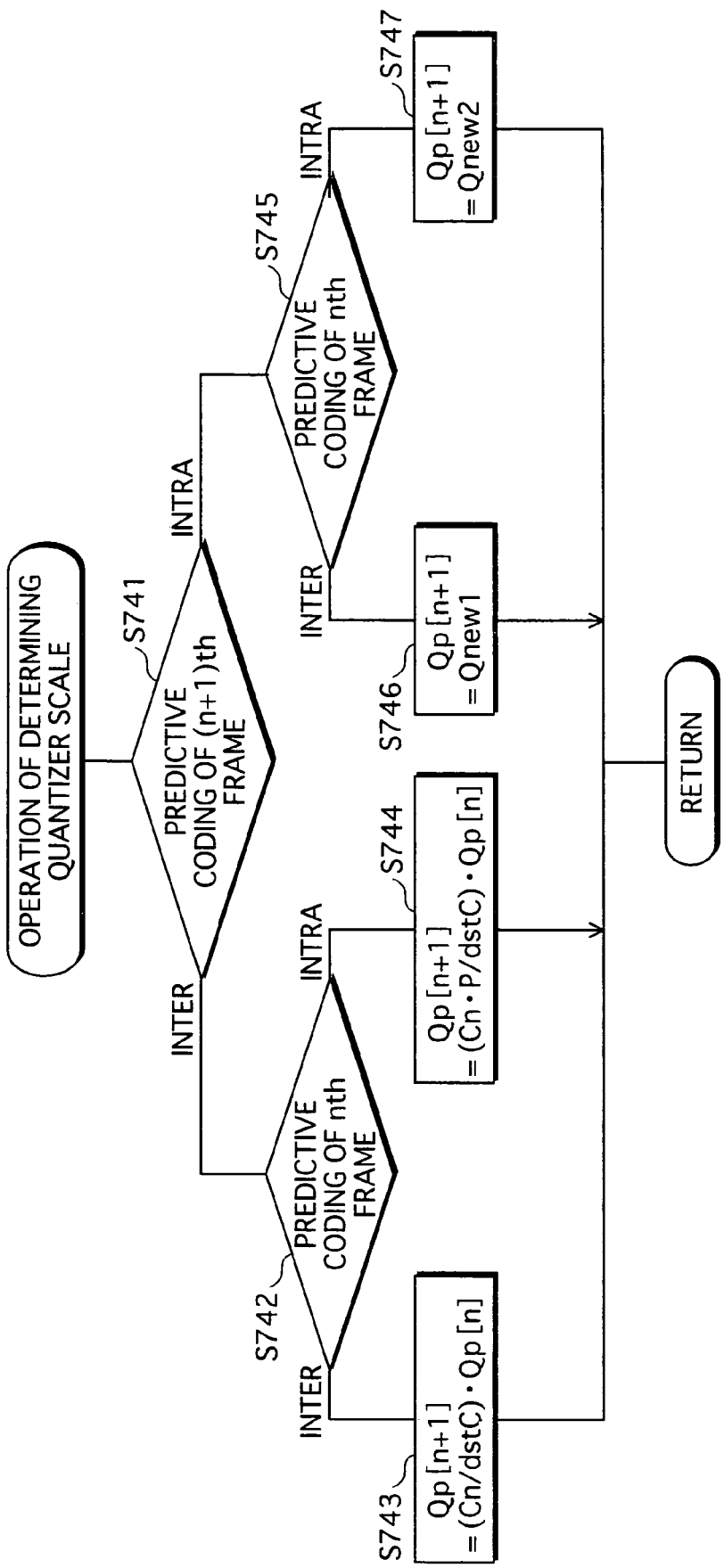
FIG. 22 is a diagram showing details of an operation of determining a quantizer scale according to the seventh embodiment.

FIG. 22 is a diagram showing details of an operation of determining the quantizer scale according to the seventh embodiment.

When the microcomputer 4 instructs to inter-code the frame (n+1) (Step S741: INTER) and the frame n has been inter-coded (Step S742: INTER), the moving picture coding apparatus 37 determines the quantizer scale Qp[n+1] to be used in quantization of the frame (n+1) to (Cn/dstC)*Qp[n] (Step S743). If the frame n has been intra-coded (Step S742: INTRA), the moving picture coding apparatus 31 determines the quantizer scale Qp[n+1] to be used in quantization of the frame (n+1) to be (Cn*P/dstC)*Qp[n] (Step S744).

Moreover, when the microcomputer 4 instructs to intra-code the frame (n+1) (Step S741: INTRA) and the frame n has been inter-coded (Step S745: INTER), the moving picture coding apparatus 37 determines the quantizer scale Qp[n+1] to be used in quantization of the frame (n+1) to be Qnew1 (Step S746). If the frame n has been intra-coded (Step S745: INTRA), the moving picture coding apparatus 37 determines the quantizer scale Qp[n+1] to be used in quantization of the frame (n+1) to be Qnew2 (Step S747).

[Effect]

With the seventh embodiment, it is possible to obtain the same effect as in the sixth embodiment.

Eighth Embodiment

In an eighth embodiment, the quantizer scale is determined for each block line. A block line is a line of macro blocks that are aligned in matrix in an image.

[Structure]

Figure 23:
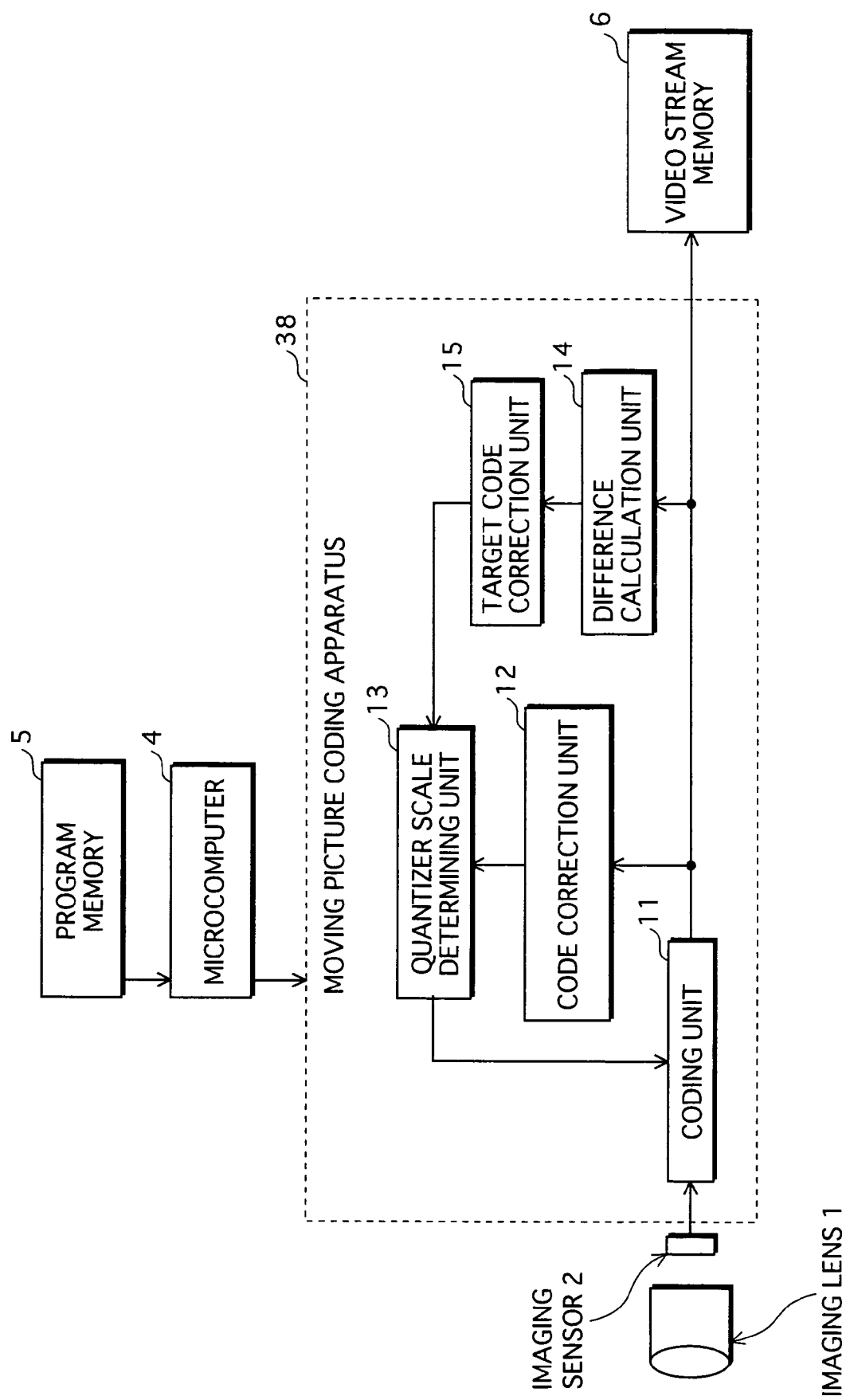
FIG. 23 illustrates a structure of a moving picture imaging apparatus according to a eighth embodiment.

FIG. 23 illustrates a structure of the moving picture imaging apparatus according to the eighth embodiment.

A moving picture coding apparatus 38 according to the eighth embodiment is substantially the same as the moving picture coding apparatus 33 according to the third embodiment, and only the structures of the code correction unit 12 and the quantizer scale determining unit 13 are different from the third embodiment. Therefore, the explanation about the same components is not given here.

The code correction unit 12 measures an amount of codes generated in each block line, and corrects the amount of generated codes Cn according to a formula 24 for correction.

Note that, in the eighth embodiment, an amount of codes generated in a predetermined number of block lines is referred to in order to determine the quantizer scale for a block line (n+1). Here, an example in which one frame includes seven block lines, and seven block lines immediately preceding the block line (n+1) is referred to in order to determine the quantizer scale for the block line (n+1) is explained.

$$Cn'=CAna*P1+CAnb*P2 \quad \text{Formula 24}$$

In the above formula, CAna is an amount of codes generated in block lines that have been intra-coded out of an amount of codes generated in the last seven block lines, and CAnb is an amount of codes generated in block lines that have been inter-coded out of the amount of codes generated in the last seven block lines. Further, P1 and P2 are the correction coefficients whose relation is P1<P2. In the eighth embodiment, the case in which P1=P where (0<P<1) and P2=1 is taken as an example. The correction coefficient P satisfies the formula 4.

The quantizer scale determining unit 13 determines the quantizer scale to be used in quantization of the block line (n+1) according to formulas 25 and 26 below.

When the block line (n+1) is to be intra-coded:

$$Qp[n+1]=Qp\text{intra} \quad \text{Formula 25}$$

When the block line (n+1) is to be inter-coded:

$$Qp[n+1]=(Cn'/dstC')*Qp[An] \quad \text{Formula 26}$$

In the above formula, Qp[An] is either an average value or a mode value of the quantizer scales for the seven block lines to be referred to.

The following describes an example of a structure for realizing the calculation of the formula 24.

Figure 24:
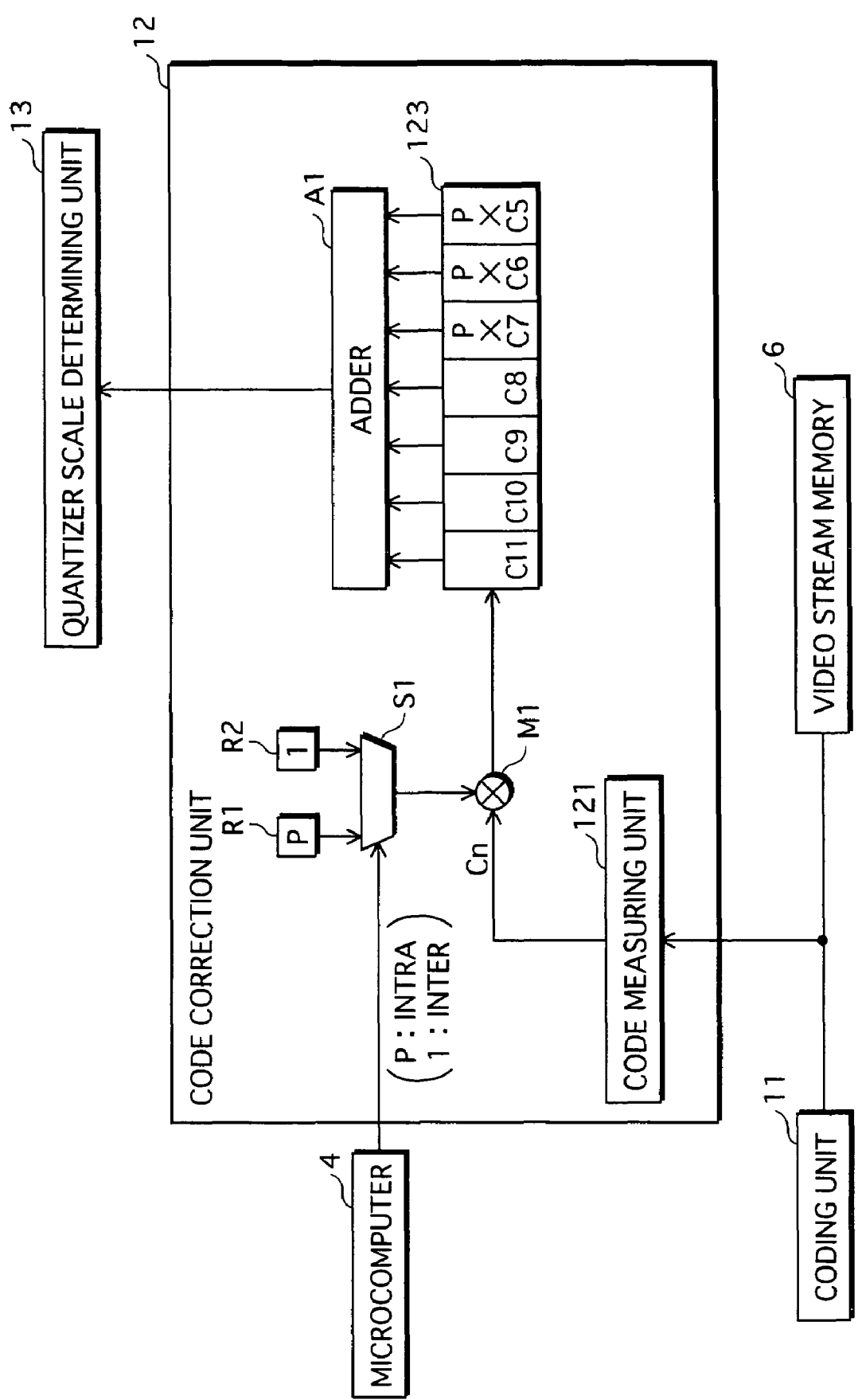
FIG. 24 shows an example of a detailed structure of the code correction unit 12.

FIG. 24 shows an example of the detailed structure of the code correction unit 12.

The code correction unit 12 includes the code measuring unit 121, a block line code memory 123, the registers R1 and R2, the selector S1, the multiplier M1, and the adder A1.

The code measuring unit 121 measures the amount of generated codes Cn of the block line n that has been coded by the coding unit 11. The register R1 holds the correction coefficient P, and the register R2 holds a correction coefficient 1. The selector S1, according to the instruction from the microcomputer 4, gives the correction coefficient P to the multiplier M1 when the block line n is intra-coded, and gives the correction coefficient 1 to the multiplier M1 when the block line n is inter-coded.

The multiplier M1 multiplies the amount of generated codes Cn and the correction coefficient given to the multiplier M1.

The block line code memory 123 is a shift register composed of seven registers. The result of calculation in the multiplier M1 is stored in the block line code memory 123 in a sequential order. The adder A1 adds the stored results, and derives the corrected amount of codes Cn'.

In FIG. 24, the amounts of codes generated respectively in block lines C5 to C11. In the drawing, its assumed that the block lines C5 to C7 are intra-coded, and the block lines C8 to C11 are inter-coded.

In this case, the result of the calculation in the adder A1 is as in a formula 27 below.

$$Cn'=(C5+C6+C7)*P+(C8+C9+C10+C11) \quad \text{Formula 27}$$

In the above formula, C5+C6+C7 is the total amount of codes CAna generated in the intra-coded block lines, and C8+C9+C10+C11 is the total amount of codes CAnb generated in the inter-coded block lines.

By the above structure, it is possible for the code correction unit 12 to output the corrected amount of codes Cn' derived by the formula 24.

[Operation]

Figure 25:
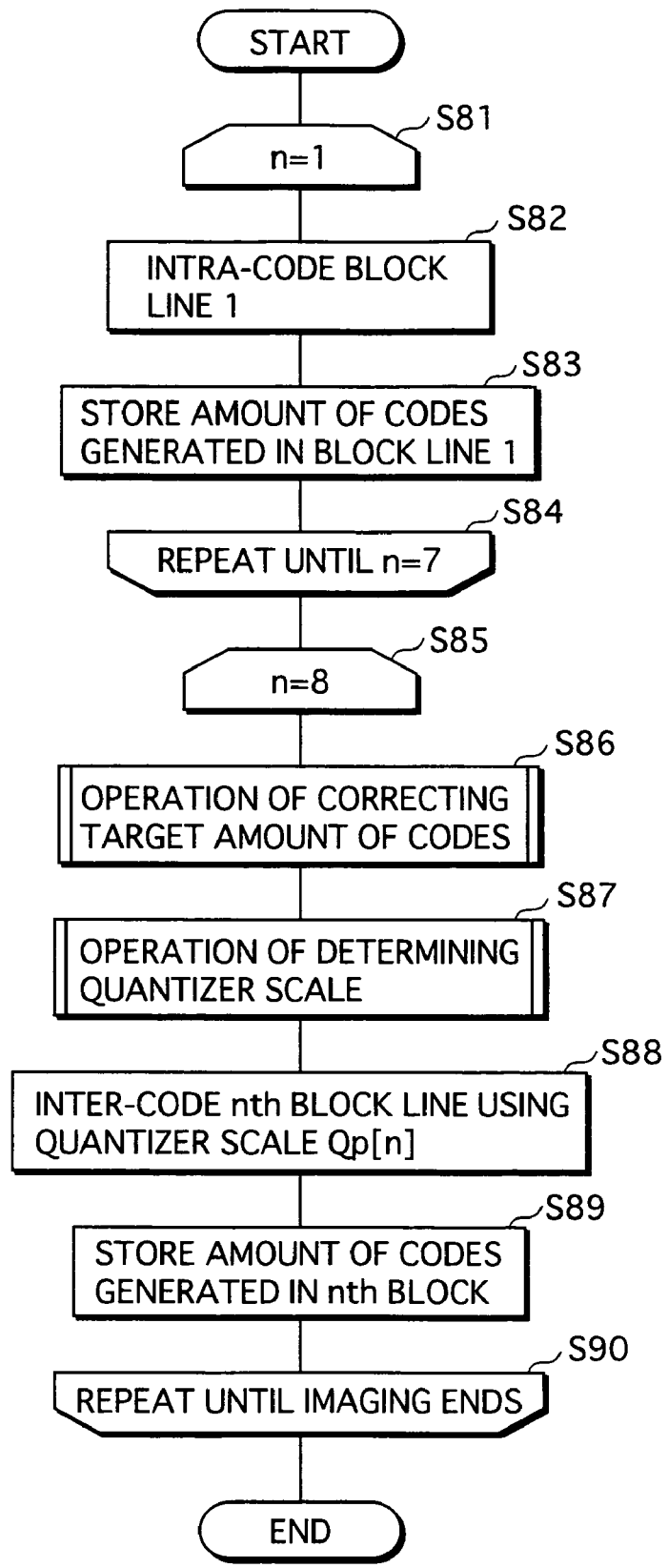
FIG. 25 shows an operation of a moving picture coding apparatus 38 according to the eighth embodiment.

FIG. 25 is a diagram showing an operation of the moving picture coding apparatus 38 according to the eighth embodiment.

The moving picture coding apparatus 38 starts coding in response to the instruction from the microcomputer 4. First, the moving picture coding apparatus 38 intra-codes a block line 1 (Step S82). Because there is no preceding block line to the block line 1, the block line 1 is always intra-coded. As the initial value of the quantizer scale, Qpintra that is to be used when a block line is intra-coded is used. Then, the moving picture coding apparatus 38 stores the amount of codes generated in the block line 1 in the block line code memory 123 (Step S83). Because the block line 1 is intra-coded here, C1*P is stored in the block line code memory 123.

After this, the moving picture coding apparatus 38 repeats the operations from Step S81 through Step S84 until the coding of the block line 7 finishes, and thus, the intra-coding of the frame 1 is completed.

Once the intra-coding of the block line 7 is completed, the moving picture coding apparatus 38 corrects the target amount of codes-(Step S86), and determines the quantizer scale for the block lines 8 based on the total amount of codes generated in the block lines 1 to 7, the quantizer scales in the block lines 1 to 7, and the corrected target amount of codes (Step S87). Then the moving picture coding apparatus 38 inter-codes the block lines 8 using the determined quantizer scale (Step S88).

The moving picture coding apparatus 38 stores an amount of codes generated in the block line 8 in the block line code memory 123 (Step S89). Because the block line 8 is inter-coded here, C8 is stored in the block line code memory 123. After this, the moving picture coding apparatus 38 repeats the operations from Step S85 through Step S90 until the microcomputer 4 instructs to stop imaging.

Figure 26:
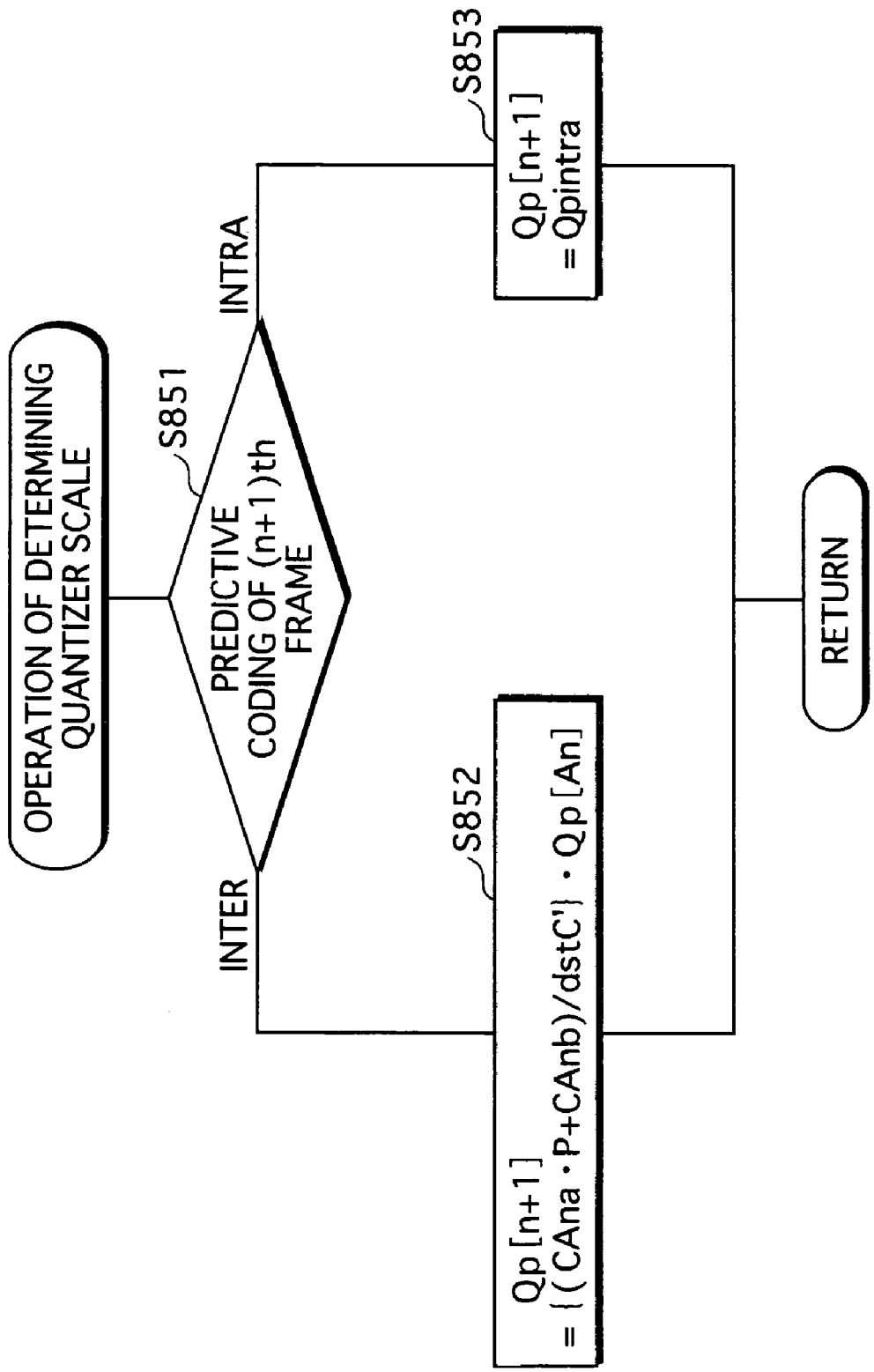
FIG. 26 is a diagram showing details of an operation of determining a quantizer scale according to the eighth embodiment.

FIG. 26 is a diagram showing details of the operation of determining the quantizer scale according to the eighth embodiment.

When the microcomputer 4 instructs to inter-code the block line (n+1) (Step S851: INTER), the moving picture coding apparatus 38 determines the quantizer scale Qp[n+1] to be used in quantization of the block line (n+1) to be {(CAna*P+CAnb)/dstC'}*Qp[An] (Step S852).

On the other hand, when the microcomputer 4 instructs to intra-code the block line (n+1) (Step S851: INTRA), the moving picture coding apparatus 38 determines the quantizer scale Qp[n+1] to be used in quantization of the block line (n+1) to be Qpintra (Step S853).

The operation of correcting the target amount of codes is the same operation as in the third embodiment, and therefore an explanation is not given here.

[Effect]

Figure 27:
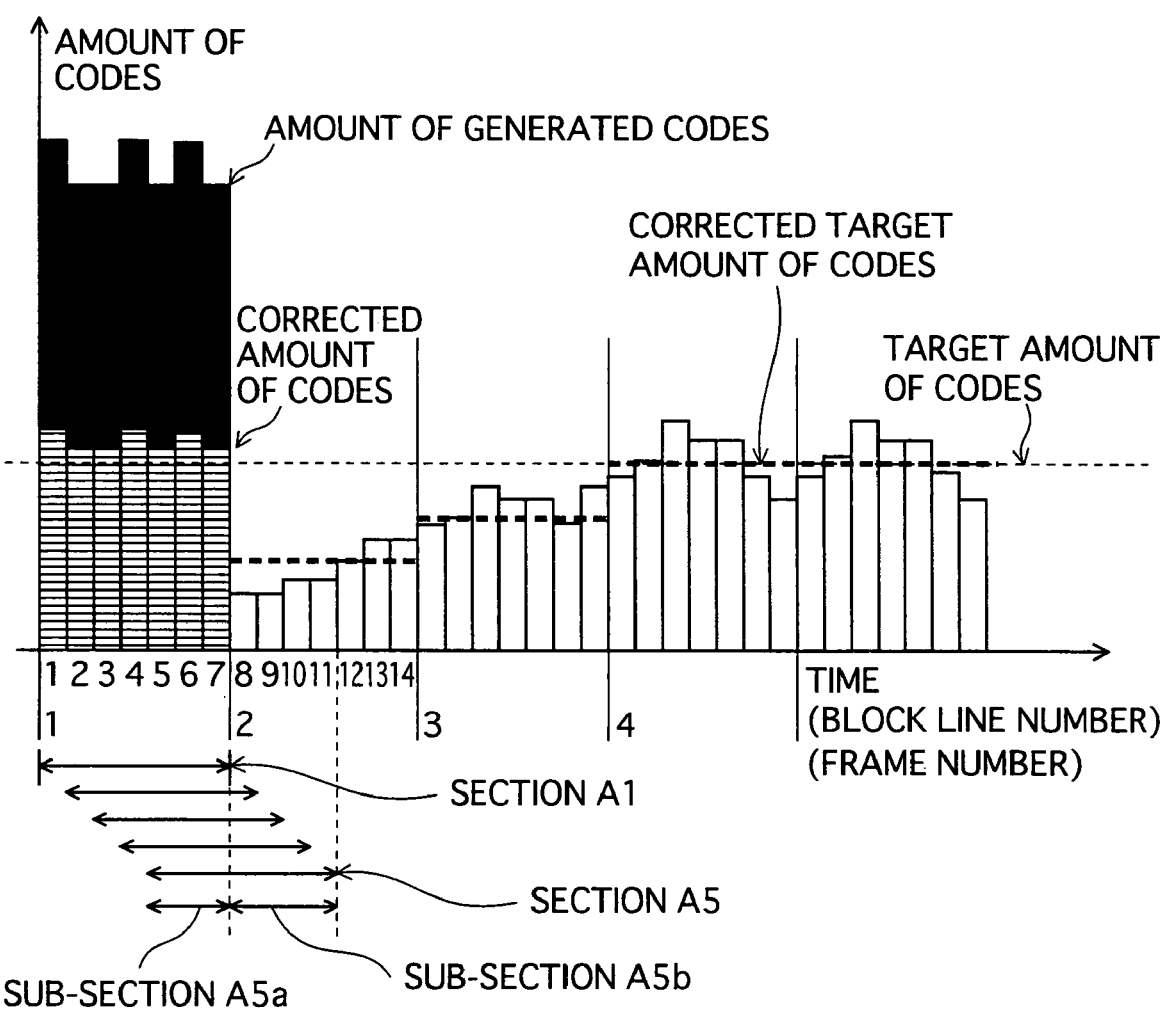
FIG. 27 shows a diagram showing the chronological shift of the amount of codes according to the eighth embodiment.

FIG. 27 shows a diagram illustrating chronological shifts of the amount of codes according to the eighth embodiment.

When determining the quantizer scale for the block line 12, the amount of codes generated in the seven block lines (block lines C5 to C11) included in a section A5 is referred to. Among the seven block lines in the section A5, the block lines 5 to 7 in a sub-section A5*a* are intra-coded, and therefore to be corrected. The block lines 8 to 11 in a sub-section A5*b* among the seven block lines in the section A5 are inter-coded, and therefore not to be corrected.

By determining the quantizer scale for each block line as described above, it is possible to adjust the amount of codes stable over units of a smaller period of time.

Ninth Embodiment

In a ninth embodiment, the moving picture coding apparatus 39 is capable of performing all types of the methods of determining the quantizer scale from the first to eight embodiments, and one of the methods randomly selected by a user is used to determine the quantizer scale.

[Structure]

Figure 28:
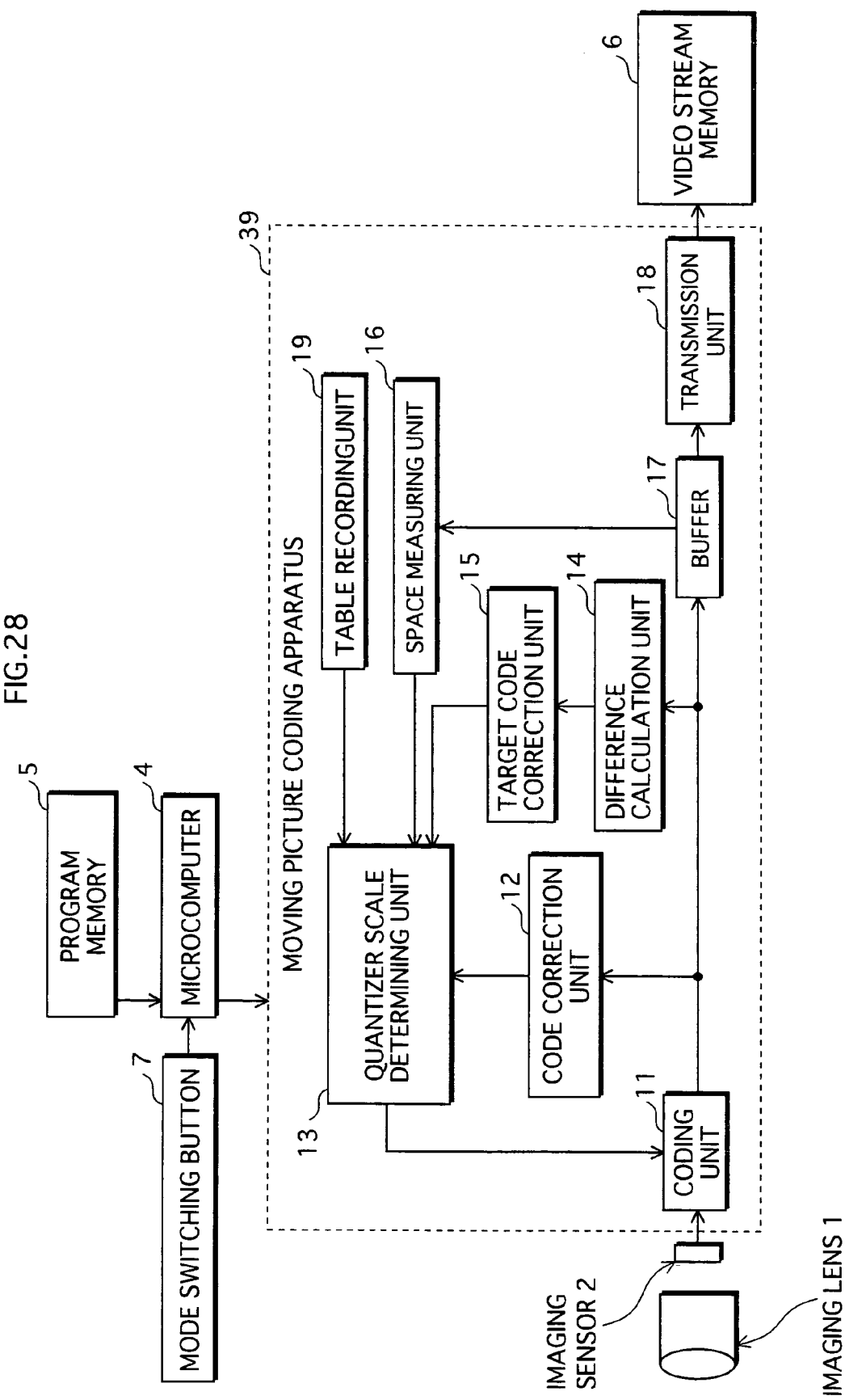
FIG. 28 illustrates a structure of a moving picture imaging apparatus according to a ninth embodiment.

FIG. 28 illustrates a structure of the moving picture imaging apparatus according to the ninth embodiment.

The moving picture imaging apparatus is provided with a mode switching button 7. Other than this, the moving picture imaging apparatus according to the ninth embodiment is the same as the moving picture imaging apparatus according to the first to eight embodiments, and therefore an explanation is not given here.

The mode switching button 7 accepts a selection of one of the methods of determining the quantizer scale. The selection is notified to the moving picture coding apparatus 39 via the microcomputer 4. The moving picture coding apparatus 39 codes the moving picture using the selected method of determining the quantizer scale.

The above describes the moving picture imaging apparatus and the moving picture coding apparatus based on the preferred embodiments. However, the present invention is not restricted to the above embodiments, and the following variations may be included in the present invention.

Figure 1B:
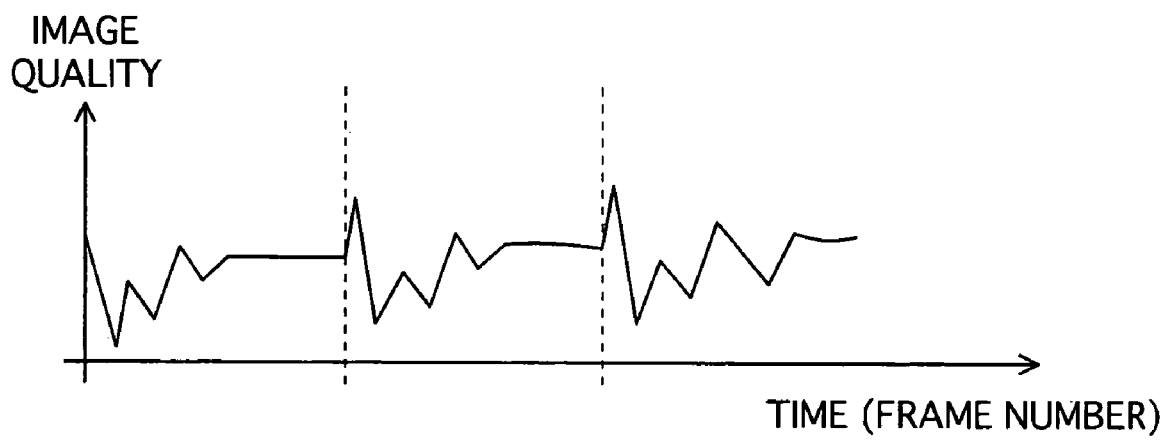

(1) In the above preferred embodiments, the code correction unit 12 performs the correction by multiplying Cn and the correction coefficient, in order to realize the formula Qp[n+1]=(Cn*P/dstC)*Qp[n]. However, the interpretation of the formula is not restricted to the above embodiments. For example, it is possible to take the following interpretation that, instead of correcting the amount of generated codes, the target amount of codes may be corrected to be P/dstC when the frame n has been intra-coded. In this case, the code correction unit 12 in FIG. 1 is not necessary, and the quantizer scale determining unit 13 selects P/dstC as the target amount of codes when the frame n has been intra-coded, and 1/dstC when the frame n has been inter-coded.

(2) In the above preferred embodiments, the correction coefficient P is the fixed value. However, the correction coefficient P is not restricted to the fixed value, and may become greater as the quantizer scale for the frame to be referred becomes smaller, as in a formula 28 as follows.

$$P=1/(Qn-b)+c \qquad \text{Formula 28}$$

In the formula, b and c are adjustable parameters.

Moreover, the quantizer scale may also be determined by referring to a straight line or a constant number that is approximated by the formula 28, or a table given to each quantizer scale.

(3) In the sixth embodiment, the correction of the target amount of codes is performed frame by frame. However, the correction may be performed for each block line.

(4) The coding unit 11 is explained to be the MPEG encoder. However, the coding unit 11 is not restricted to the MPEG encoder if it is possible to code the data by using both predictive coding and quantization.

(5) In the above preferred embodiments, the quantizer scale for the frame (n+1) is deteremined by calculation. However, the present invention is not restricted to this. For example, the quantizer scales for the frame (n+1) may be selected from a plurality of quantizer scales stored in correspondence with combinations of the predictive coding, the quantizer scale, and the amount of generated codes of the frame n. In this case, the quantizer scale may be deteremined without calculating for each frame.

(6) In the above preferred embodiments, various parameters of the frame n (the predictive coding, the quantizer scale, and the amount of generated codes of the frame n) are taken into account. However, the present invention is not restricted to this example, and may take parameters of any frame that precedes the frame (n+1) into account. For example, it is possible to use parameters of a frame (n−1).

(7) In the above preferred embodiments, various parameters of one frame are taken into account. However, the present invention is not restricted to this, and the parameters of more than one frame may be used. Although using the parameters of more than one frame increases the processing load of the moving picture coding apparatus, the effect of suppressing the hunting becomes greater when using the parameters of more than one frame.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A moving picture coding apparatus comprising:
   a coding unit operable to selectively inter-code or intra-code data of each of a plurality of frames of a moving picture, the inter-coding and intra-coding each involving quantization; and
   a determining unit operable to determine, based on an amount of codes generated only in a first frame that is immediately previous to a second frame, a quantizer scale to be used in quantization of data of the second frame, wherein
   when the coding unit is to inter-code the data of the second frame, the determination is done by using (i) a first method immediately after data of the first frame has been inter-coded, or (ii) a second method immediately after the data of the first frame has been intra-coded, the quantizer scale determined by using the second method taking a smaller value than that determined by using the first method.

2. A moving picture coding apparatus according to claim 1, wherein
   the second method is set in a manner that the quantizer scale determined by using the second method is a fixed value, determined in advance, that falls within a range of ⅕ to ⅓ inclusive of that determined by using the first method.

3. A moving picture coding apparatus according to claim 1, further comprising:
   a difference obtaining unit operable to obtain a difference between (i) a cumulative amount of codes generated in the immediately previous first frame and frames preceding the immediately previous first frame and (ii) a cumulative target amount of codes predetermined for the immediately previous first frame and the frames preceding the immediately previous first frame, wherein the first and second methods are set in a manner that the determined quantizer scale becomes greater as an amount of the difference to the amount of generated codes becomes greater.

4. A moving picture coding apparatus according to claim 1, wherein
when the coding unit is to intra-code the data of the second frame immediately after coding the data of the first frame, the determining unit determines the quantizer scale by using a third method, the quantizer scale determined by using the third method taking a greater value than that determined by using the first method.

5. A moving picture coding apparatus according to claim 1, further comprising:
a buffer operable to store the coded data for the moving picture, wherein
when the coding unit is to intra-code the data of the second frame immediately after coding the data of the first frame, the determining unit (i) sets the quantizer scale to a fixed value if the buffer has a free space of a predetermined size or larger, and (ii) determines the quantizer scale by using a third method if the buffer has a free space smaller than the predetermined size, the quantizer scale determined by using the third method taking a greater value than that determined by using the first method.

6. A moving picture coding apparatus according to claim 1, wherein
when the coding unit is to intra-code the data of the second frame immediately after coding the data of the first frame, the determining unit determines the quantizer scale to be used in the second frame based on a quantizer scale used in quantization of the first frame, regardless of the amount of generated codes in the immediately previous first frame.

7. A moving picture coding apparatus according to claim 6, wherein
when the coding unit is to intra-code the data of the second frame after coding the data of the first frame, the determining unit determines the quantizer scale to be used in the second frame by multiplying the quantizer scale used in the immediately previous first frame by a predetermined value.

8. A moving picture coding apparatus according to claim 7, wherein
the predetermined value is a fixed value, determined in advance, that is in a range of $5/4$ to $4/3$.

9. A moving picture coding apparatus according to claim 6, further comprising:
a recording unit operable to record a table showing correspondence between the quantizer scale for the first frame and the quantizer scale for the second frame, wherein
the determining unit determines the quantizer scale to be used in the second frame based on a quantizer scale used in the immediately previous first frame by referring to the table.

10. A moving picture imaging apparatus comprising:
an imaging device operable to take an image of an object to generate a moving picture;
a coding unit operable to selectively inter-code or intra-code data of each of a plurality of frames of the moving picture, the inter-coding and intra-coding each involving quantization; and
a determining unit operable to determine, based on an amount of codes generated only in a first frame that is immediately previous to a second frame, a quantizer scale to be used in quantization of data of the second frame, wherein
when the coding unit is to inter-code the data of the second frame, the determination is done by using (i) a first method immediately after data of the first frame has been inter-coded, or (ii) a second method immediately after the data of the first frame has been intra-coded, the quantizer scale determined by using the second method taking a smaller value than that determined by using the first method.

* * * * *